United States Patent
Goto et al.

(10) Patent No.: US 10,212,620 B2
(45) Date of Patent: Feb. 19, 2019

(54) BASE STATION APPARATUS AND TERMINAL APPARATUS

(71) Applicant: Sharp Kabushiki Kaisha, Sakai, Osaka (JP)

(72) Inventors: Jungo Goto, Osaka (JP); Osamu Nakamura, Osaka (JP); Hiromichi Tomeba, Osaka (JP); Shiro Wakahara, Osaka (JP); Yasuhiro Hamaguchi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/510,525

(22) PCT Filed: Aug. 28, 2015

(86) PCT No.: PCT/JP2015/074393
§ 371 (c)(1),
(2) Date: Mar. 10, 2017

(87) PCT Pub. No.: WO2016/039179
PCT Pub. Date: Mar. 17, 2016

(65) Prior Publication Data
US 2017/0265096 A1 Sep. 14, 2017

(30) Foreign Application Priority Data
Sep. 12, 2014 (JP) .................. 2014-185780

(51) Int. Cl.
*H04W 24/10* (2009.01)
*H04J 11/00* (2006.01)
(Continued)

(52) U.S. Cl.
CPC .......... *H04W 24/10* (2013.01); *H04B 17/318* (2015.01); *H04J 11/00* (2013.01);
(Continued)

(58) Field of Classification Search
CPC .............. H04W 24/10; H04W 56/001; H04W 72/0446; H04W 88/08; H04L 5/14; H04L 27/2626
See application file for complete search history.

(56) References Cited

U.S. PATENT DOCUMENTS

2013/0165134 A1* 6/2013 Touag ............... H04W 72/0486
455/452.1
2014/0112289 A1* 4/2014 Kim ..................... H04W 16/14
370/329
2015/0131536 A1 5/2015 Kaur et al.

FOREIGN PATENT DOCUMENTS

EP 2649744 A1 10/2013

OTHER PUBLICATIONS

Ericsson, Qualcomm, Huawei "Study on Licensed-Assisted Access using LTE", RP-140259, 3GPP TSG RAN Meeting #63, Fukuoka, Japan, Mar. 3-6, 2014.

* cited by examiner

*Primary Examiner* — Ian N Moore
*Assistant Examiner* — Latresa A McCallum
(74) *Attorney, Agent, or Firm* — Birch, Stewart, Kolsch & Birch, LLP

(57) ABSTRACT

A time period between transmission of a synchronization signal and the next transmission thereof may become undesirably longer depending on a usage state of an unlicensed band and a terminal apparatus requires a long time to measure receive power of signals from a plurality of base station apparatuses that perform communication in the unlicensed band. A base station apparatus that communicates with a terminal apparatus in a second frequency band different from a first frequency band includes: a DL signal generator that generates a signal to be transmitted to the terminal apparatus; a radio transmitter that transmits the
(Continued)

signal; and a connected terminal manager that receives subframe information to be transmitted to the terminal apparatus from another base station apparatus that communicates with the terminal apparatus in the first frequency band. The radio transmitter transmits the signal with at least one subframe included in the subframe information.

10 Claims, 15 Drawing Sheets

(51) Int. Cl.
*H04W 16/14* (2009.01)
*H04W 56/00* (2009.01)
*H04L 5/14* (2006.01)
*H04L 27/26* (2006.01)
*H04W 72/04* (2009.01)
*H04B 17/318* (2015.01)
*H04W 88/08* (2009.01)
*H04W 28/08* (2009.01)

(52) U.S. Cl.
CPC ............ *H04L 5/14* (2013.01); *H04L 27/2626* (2013.01); *H04W 16/14* (2013.01); *H04W 56/00* (2013.01); *H04W 56/001* (2013.01); *H04W 72/0446* (2013.01); *H04W 28/08* (2013.01); *H04W 88/08* (2013.01)

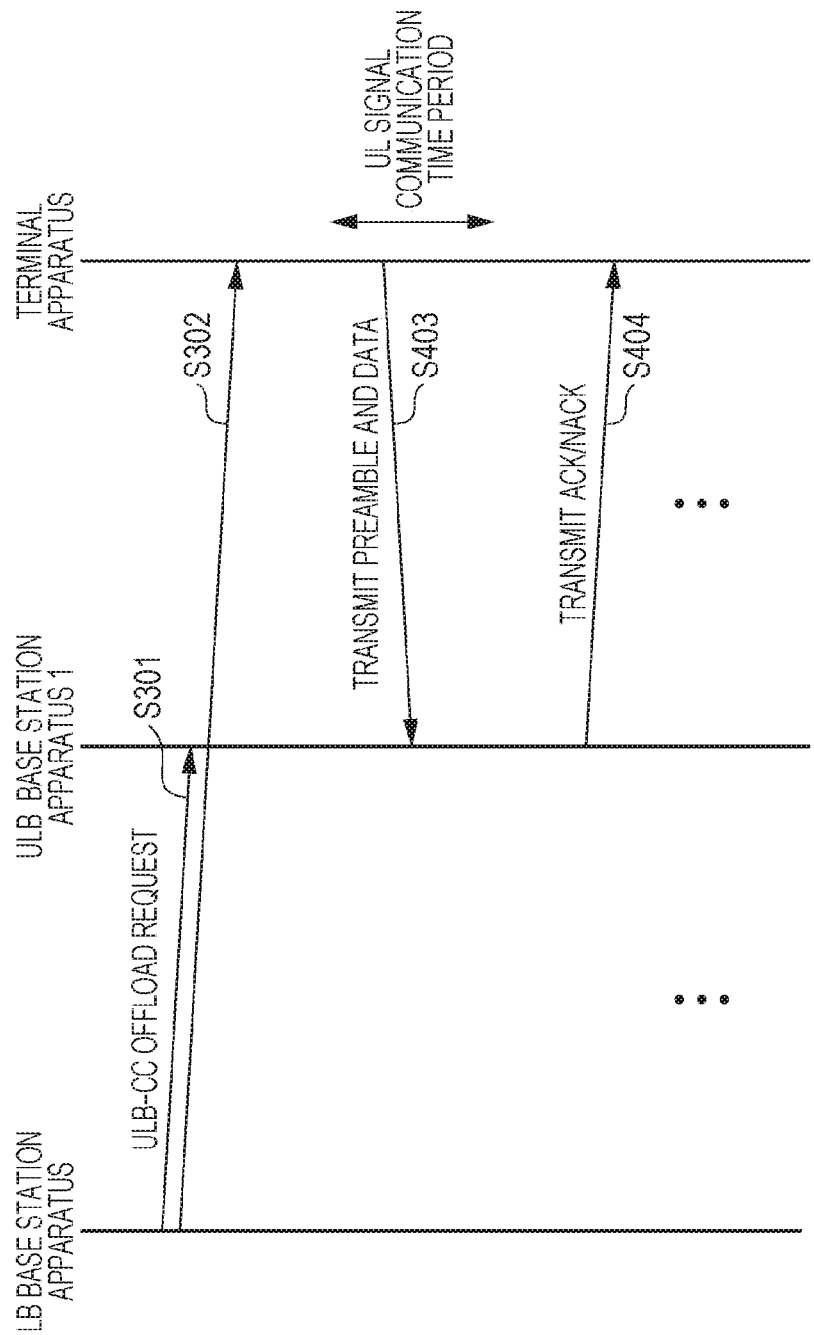

BASE STATION APPARATUS AND TERMINAL APPARATUS

TECHNICAL FIELD

The present invention relates to a base station apparatus and a terminal apparatus.

BACKGROUND ART

Standardization of the LTE (Long Term Evolution) system (Rel. 8 and Rel. 9), which is a radio communication system for 3.9th generation mobile phones, has been completed, and the LTE-A (LTE-Advanced, also referred to as IMT-A, for example) system (Rel. 10 and thereafter) as a more advanced LTE system is currently being standardized as one of the 4th generation radio communication systems.

In the LTE system and the LTE-A system, it is necessary to cope with a rapid increase in data traffic, and securing frequency resources is one of the significant issues in addition to introducing a technique of increasing a peak data rate and frequency use efficiency. In the LTE system and the LTE-A system, it has been assumed so far to use a frequency band which is referred to as a so-called licensed band whose license is obtained from a country or an area where a cellular operator provides a service, and an available frequency band is limited.

Thus, it has been discussed recently to provide the LTE system (also referred to as LTE-U) using a frequency band which is referred to as a so-called unlicensed band that does not require a license from a country or an area (refer to NPL 1). In the LTE-A system, a CA (Carrier Aggregation) technique has been adopted in which one system band of the LTE system is set as a component carrier (CC, also referred to as a Serving Cell) and a plurality of CCs are used to perform communication. It is expected to apply the CA technique also to the unlicensed band and utilize the unlicensed band by LAA (Licensed Assisted Access) using information provided from the licensed band, as one of the methods with which a rapid increase in data traffic is able to be coped with.

In addition, not only the unlicensed band but also a frequency band called a white band (white space) which is not actually used but is provided for preventing interference between frequencies (for example, a frequency band which has been allocated for television broadcasting, but is not used in some areas) and, a shared frequency band which has been exclusively allocated to a specific operator so far, but is expected to be shared between a plurality of operators in the future, and other bands are also considered to be used for cellular communication in the future.

Meanwhile, in the LTE system and the LTE-A system, when a terminal apparatus (a terminal, a mobile terminal, a mobile station, UE; User Equipment) receives signals of a plurality of base station apparatuses, a base station apparatus to be connected is decided by using a measurement result of receive power or the like. First, the terminal apparatus detects PSS/SSS (Primary Synchronization Signal/Secondary Synchronization Signal) which are synchronization signals and identifies a cell ID. Then, the terminal apparatus receives a reference signal of a sequence generated with use of a cell ID, in a resource which is decided in accordance with the cell ID and in which the reference signal is transmitted, and measures receive power. By reporting the receive power of the signals from the plurality of base station apparatuses to the base station apparatus which has been connected, the terminal apparatus receives an instruction of handover from the base station apparatus or transmits a scheduling request in a case of initial connection, thereby being able to be connected to the base station apparatus from which the terminal apparatus is able to obtain high receive power.

CITATION LIST

Non Patent Literature

NPL 1: RP-140259, "Study on Licensed-Assisted Access using LTE," 3GPP TSG RAN Meeting #63, March, 2014.

SUMMARY OF INVENTION

Technical Problem

Since the unlicensed band is used also for communication by a RAT (Radio Access Technology) different from the LTE as represented by the IEEE802.11 system, the LTE-A system and another system need to coexist. In particular, based on the premise that the conventional LTE-A system uses the licensed band, the conventional LTE-A system does not have a design in consideration of a case where a frequency band to be used is occupied by another system. In a case where there are a plurality of base station apparatuses performing communication in the unlicensed band, similarly to the LTE system, it is considered that a terminal apparatus acquires a cell ID by receiving a plurality of subframes which are in one frame and which include the PSS/SSS transmitted at an interval of a few subframes. However, each of the base station apparatuses performing communication in the unlicensed band needs to perform carrier sense (for example, Listen Before Talk) when transmitting signals in order to avoid collision with a different system, and it is thus difficult for the base station apparatus to transmit the PSS/SSS in a constant cycle when the different system uses the unlicensed band. That is, a period between transmission of PSS/SSS and the next transmission thereof may become long depending on a usage state of the unlicensed band, and it may take a long time for the terminal apparatus to measure receive power of signals from a plurality of base station apparatuses performing communication in the unlicensed band. Also in a case where the LTE-A system uses a frequency band such as a white band (white space) other than the licensed band, similarly to a case of using the unlicensed band, there is a possibility that the LTE-A system is affected depending on a usage state of another system and a similar problem may arise.

The invention has been made in view of the aforementioned points, and provides a communication method that enables, when an LTE-A system shares an unlicensed band or a white band with another system, a terminal apparatus to communicate efficiently with a plurality of base station apparatuses performing communication in the unlicensed band or the white band.

Solution to Problem (1) The invention has been made to solve the aforementioned problems, and an aspect of the invention is a base station apparatus that communicates with a terminal apparatus in a second frequency band different from a first frequency band that is able to be used exclusively, the base station apparatus including: a DL signal generation unit that generates a signal to be transmitted to the terminal apparatus; a radio transmission unit that transmits the signal; and a connected terminal management unit that receives information about a plurality of subframes in which a signal is able to be transmitted to the terminal apparatus from another base station apparatus that communicates with the terminal apparatus in the first frequency band, in which the DL signal generation unit generates a subframe constituted by a synchronization signal and a reference signal, and the radio transmission unit transmits the signal with at least one of subframes included in the information about the plurality of subframes.

(2) According to an aspect of the invention, subframes indicated by the information about the plurality of subframes are a plurality of continuous subframes.

(3) According to an aspect of the invention, subframes indicated by the information about the plurality of subframes are periodically configured.

(4) An aspect of the invention is a base station apparatus that uses a first frequency band that is able to be used exclusively to transmit control information to a first terminal apparatus that is likely to perform communication in a second frequency band different from the first frequency band, the base station apparatus including: a connected terminal management unit that manages second terminal apparatuses that are able to communicate with the base station apparatus in the first frequency band; a control information generation unit that generates control information to be transmitted to the first terminal apparatus; and a radio transmission unit that transmits the control information, in which the connected terminal management unit selects from the second terminal apparatuses the first terminal apparatus to which control information is transmitted, the control information generation unit generates information indicating a plurality of subframes in which a synchronization signal and a reference signal are able to be transmitted in the second frequency band, and the radio transmission unit transmits the control information.

(5) According to an aspect of the invention, the control information generation unit causes the control information, which is to be generated, to include a cell ID that is used for generating at least one of the synchronization signal and the reference signal that are transmitted in the second frequency band.

(6) According to an aspect of the invention, the control information generation unit causes the synchronization signal and a data signal of downlink to be included in the information indicating a plurality of subframes in which the signals are able to be transmitted in the second frequency band.

(7) An aspect of the invention is a terminal apparatus that is able to communicate with a base station apparatus in a second frequency band different from a first frequency band that is able to be used exclusively, the terminal apparatus including: a control signal detection unit that detects control information received in the first frequency band; a synchronization signal detection unit that detects a synchronization signal transmitted by the base station apparatus; and a radio transmission unit that transmits control information in the first frequency band to the base station apparatus, in which synchronization is achieved with the synchronization signal by the synchronization signal detection unit in a time period in which the synchronization signal is received in the second frequency band, which is included in the control information detected by the control signal detection unit, receive power of a reference signal is measured by using information about a cell ID included in the synchronization signal, and information about the receive power is transmitted by the radio transmission unit to the base station apparatus.

Advantageous Effects of Invention

According to the invention, a base station apparatus is able to efficiently notify, by a licensed band, a terminal apparatus of control information for communication with an unlicensed band, and the unlicensed band is used efficiently. As a result, cell throughput is improved.

BRIEF DESCRIPTION OF DRAWINGS

FIG. 15 illustrates an example of a sequence chart according to the invention.

DESCRIPTION OF EMBODIMENTS (First Embodiment)

Figure 1:
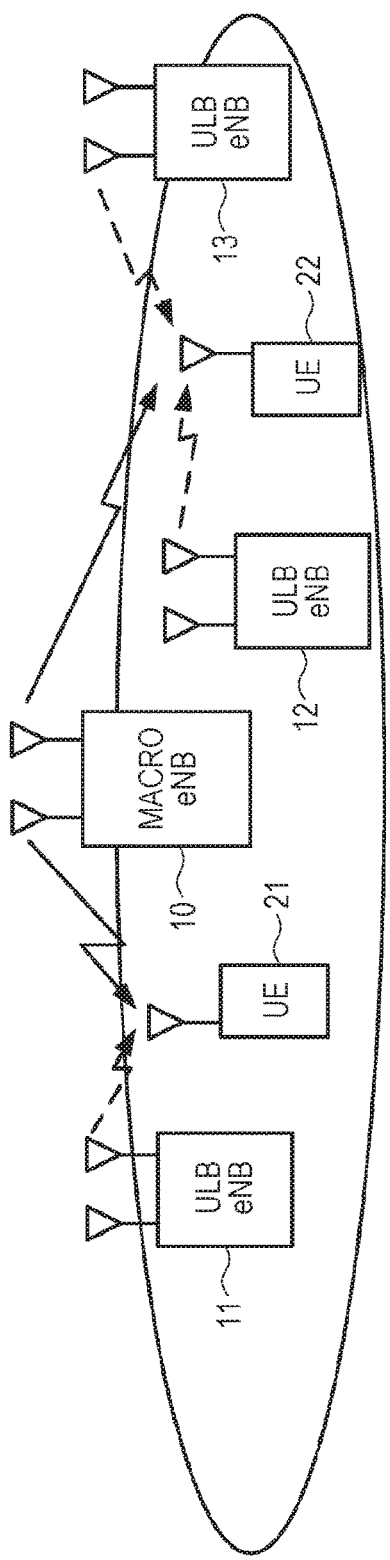
FIG. 1 illustrates an example of a configuration of a system according to the invention.

An embodiment will be described below with reference to drawings. FIG. 1 illustrates an example of a configuration of a system according to the invention. The system is constituted by a macro base station apparatus 10, ULB base station apparatuses 11, 12 and 13, and terminal apparatuses 21 and 22. Note that, the number of terminal apparatuses (terminals, mobile terminals, mobile stations, UE: User Equipment) is not limited to two, and further, the number of antennas of each of the apparatuses may be one or more. The macro base station apparatus 10 performs communication by a so-called licensed band whose license is obtained from a country or an area where a cellular operator provides a service and the ULB base station apparatuses 11, 12 and 13 perform communication by a so-called unlicensed band which does not require a license from a country or an area, but there is no limitation to such an example. For example, the macro base station apparatus 10 may support communication not only by the licensed band but also by the unlicensed band, and a pico base station apparatus (also referred to as Pico eNB: evolved Node B, SmallCell, Low Power Node, or Remote Radio Head) capable of communication by the licensed band may support communication by the unlicensed band. The unlicensed band may support only downlink that is communication from the ULB base station apparatus 11 to the terminal apparatus 21, or may support not only the downlink but also uplink that is communication from the terminal apparatus 21 to the ULB base station apparatus 11. In the present specification, description will be given by taking the unlicensed band as an example of a frequency band other than the licensed band, but the invention is not limited thereto and a white band (white space) or the like may be used.

The terminal apparatus 21 is able to receive signals from the macro base station apparatus 10 and the ULB base station apparatus 11. On the other hand, the terminal apparatus 22 is able to receive signals from the macro base station apparatus 10 and the ULB base station apparatuses 12 and 13. In such a case, the terminal apparatus 21 is able to communicate with a component carrier (CC, or also referred to as a Serving cell) of the licensed band and is also able to communicate with a CC of the unlicensed band of the ULB base station apparatus 11 by receiving information about the CC of the unlicensed band from the CC of the licensed band. In a case where the CC of the unlicensed band (hereinafter, referred to as a ULB-CC) is occupied by another system (for example, 802.11a, b, g, n, ac, or the like), however, the terminal apparatus 21 is able to perform communication only in the CC of the licensed band (hereinafter, referred to as an LB-CC). When performing communication in the ULB-CC, at least one of the ULB base station apparatus 11 and the terminal apparatus 21 needs to perform carrier sense (for example, Listen Before Talk) by which whether the ULB-CC is used by another system is checked. For example, the ULB base station apparatus 11 or the terminal apparatus 21 is able to start communication on the basis of an access scheme called CSMA/CA (Carrier Sense Multiple Access with Collision Avoidance). As a specific example of the carrier sense, the usage by another system is determined in accordance with whether or not a received level (for example, RSSI: Received Signal Strength Indicator) of a carrier frequency exceeds a threshold. Note that, though description will be given by assuming that TDD (Time Division Duplex, or also referred as a frame structure type2) is applied to the ULB-CC, FDD (Frequency Division Duplex, or also referred to as a frame structure type1) may be supported.

Next, the terminal apparatus 22 is able to perform communication by receiving information about the ULB-CCs of the ULB base station apparatuses 12 and 13 from the LB-CC of the macro base station apparatus 10. In this case, the terminal apparatus 22 is able to be used when being activated by setting the LB-CC of the macro base station apparatus 10 as a PCell (Primary cell) and setting any one or both of the ULB-CCs of the ULB base station apparatuses 12 and 13 as an SCell (Secondary cell) by means of a CA (Carrier Aggregation) technique. Here, which of the ULB-CCs is to be used for the activation or for data transmission and reception is determined by a measurement result of receive power or the like at the time when the terminal apparatus receives signals transmitted by the ULB base station apparatuses 12 and 13.

Figure 2:
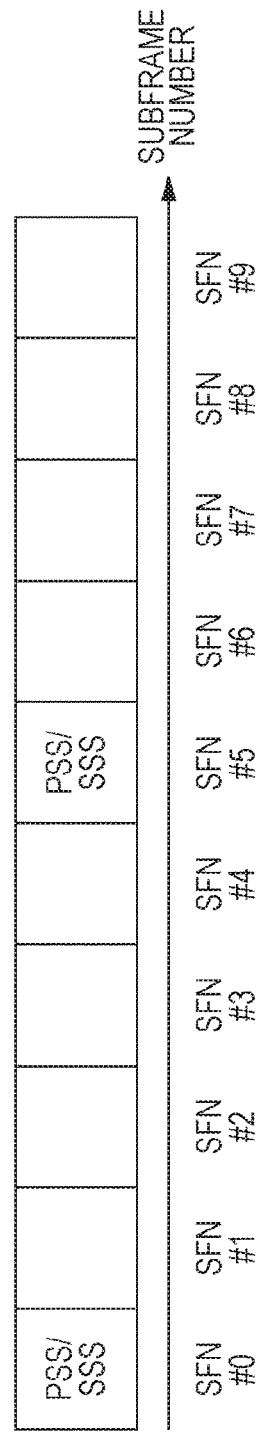
FIG. 2 illustrates a frame configuration of FDD of an LTE system.
Figure 3:
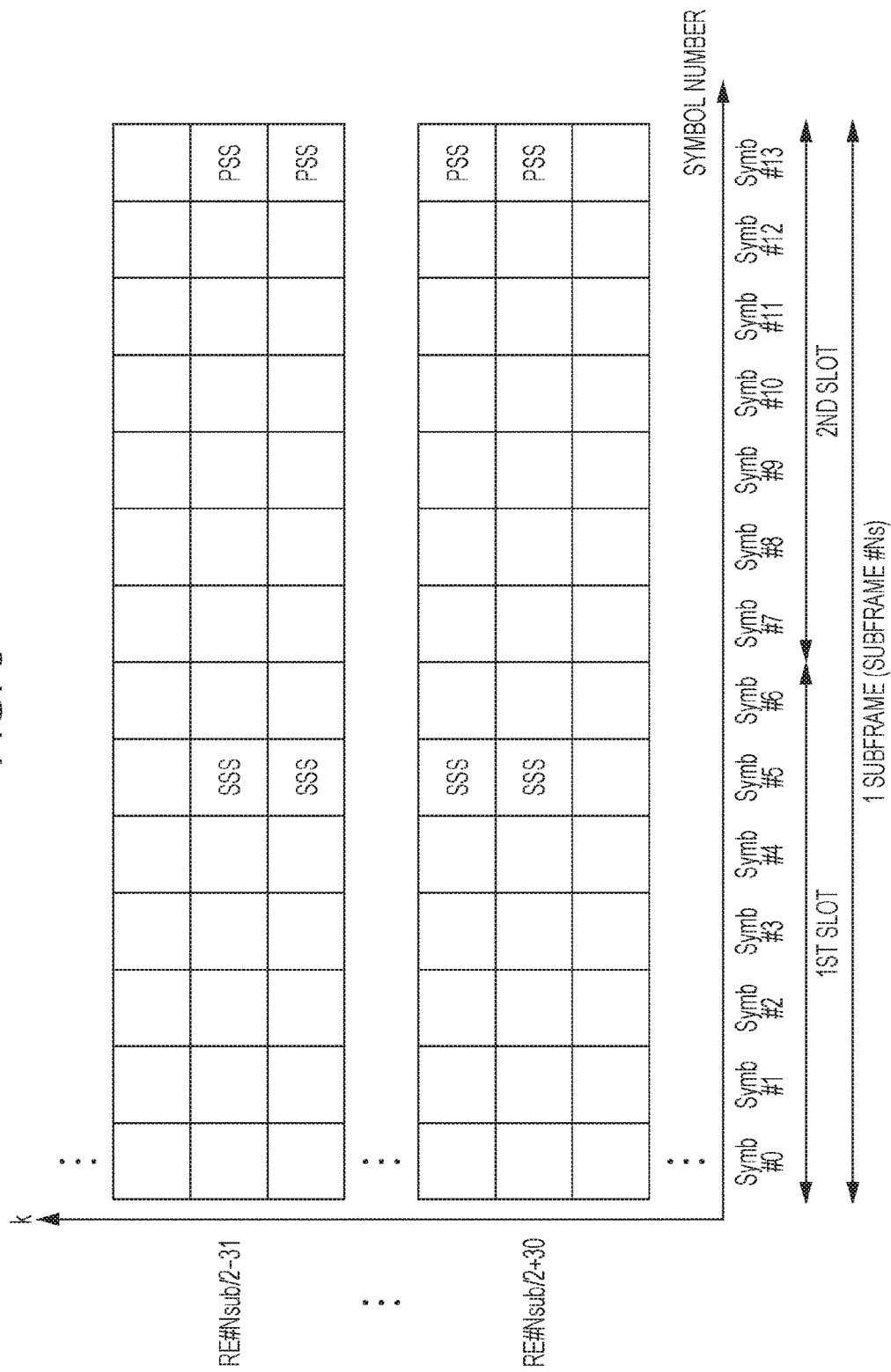
FIG. 3 illustrates allocation of synchronization signals in subframes of the FDD of the LTE system.

FIG. 2 illustrates a frame configuration of FDD of an LTE system. According to FIG. 2, in the FDD of the LTE system, one frame is formed by ten subframes and two subframes (subframes #0 and #5) each of which includes PSS/SSS (Primary Synchronization Signal/Secondary Synchronization Signal) as synchronization signals exist in one frame. The PSS has similar sequences transmitted in the subframes #0 and #5 and the SSS has different sequences transmitted in the subframes #0 and #5. FIG. 3 illustrates allocation of the synchronization signals in the subframes of the FDD of the LTE system. FIG. 3 illustrates resource elements (REs) in which the PSS and the SSS are arranged in the subframes #0 and #5, and a vertical axis k indicates a subcarrier number. First, the PSS is arranged in subcarriers Nsub/2−31 to Nsub/2+30 of the last OFDM symbol. Nsub denotes a subcarrier number in the system. Next, the SSS is arranged in subcarriers similar to those of the PSS in the sixth OFDM symbol. By detecting the PSS/SSS transmitted in this manner, the terminal apparatus is able to identify a cell ID and a subframe number. However, when the ULB-CC is used by another system, each of the ULB base station apparatuses is not able to transmit the PSS/SSS at the interval described in FIGS. 2 and 3, so that the terminal apparatus requires a time to detect the PSS/SSS. As a result, the terminal apparatus requires a longer time to measure the receive power of the ULB-CC than the case of the LB-CC.

Figure 4:
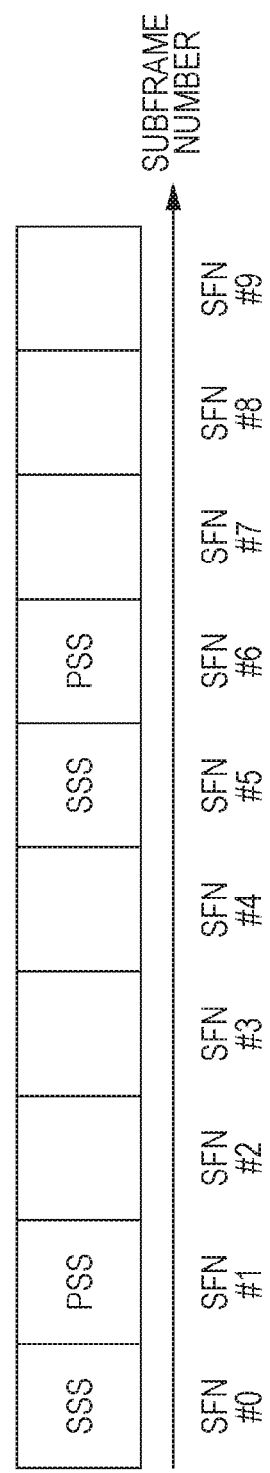
FIG. 4 illustrates a frame configuration of TDD of the LTE system.

FIG. 4 illustrates a frame configuration of the TDD of the LTE system. In the case of the TDD, numbers of subframes in which the SSS is arranged are the same as those of the FDD, but numbers of subframes in which the PSS is arranged are different therefrom and the subframes are subframes #1 and 6. The PSS is arranged in third OFDM symbols of the subframes #1 and 6. Numbers of OFDM symbols in which the SSS is arranged are different from those of the FDD and the OFDM symbols are last OFDM symbols in the subframes #0 and #5. In the case of the TDD, there are a downlink subframe, an uplink subframe, and a special subframe, and a downlink subframe in which a reference signal used for measurement of the receive power is arranged varies depending on uplink/downlink configuration. The terminal apparatus needs to measure the receive power after identifying a subframe number, and is hence able to measure the receive power after detecting a plurality of subframes in which the SSS is included. Thus, a plurality of subframes in which the SSS is included need to be detected in the case of the TDD, and in a case where the ULB-CC is used by another system, a great influence is given when the ULB base station apparatus is not able to transmit the PSS/SSS.

Figure 5:
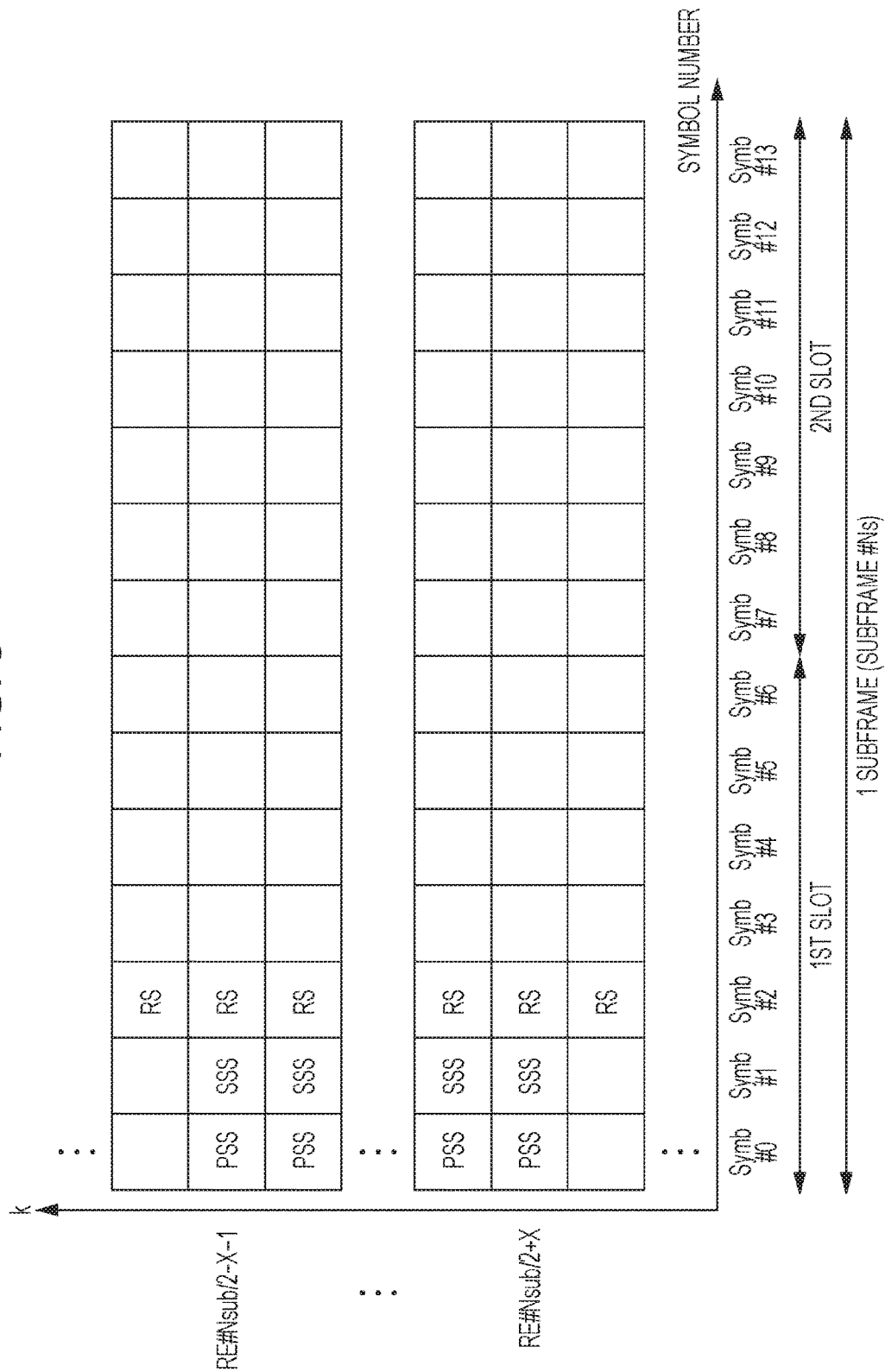
FIG. 5 illustrates an example of a configuration of a subframe transmitted by a ULB base station apparatus according to the invention.

FIG. 5 illustrates an example of a configuration of a subframe transmitted by the ULB base station apparatus according to the invention. In FIG. 5, one subframe has two slots and one slot has seven OFDM symbols similarly to the LTE system, but the invention is not limited to such an example. First, the ULB base station apparatus performs carrier sense before timing of transmitting the PSS/SSS as the synchronization signals, and checks whether another system uses the ULB-CC. When having not detected communication of another system in the ULB-CC, the ULB base station apparatus transmits signals with the subframe configuration of FIG. 5. First, the PSS is transmitted in the first OFDM symbol and the SSS is transmitted in the second OFDM symbol. Here, subcarriers in which the PSS is arranged are Nsub/2−X−1 to Nsub/2+X and the PSS may be transmitted by using more subcarriers than X=30 of the LTE system. For example, X=100, 400 may be provided to achieve synchronization in a shorter time or the PSS may be arranged in all subcarriers that are able to be used in the ULB-CC. When the PSS is arranged in more subcarriers compared to a conventional manner, a conventional sequence of the PSS becomes insufficient, but a longer Zadoff-Chu sequence may be generated or the conventional sequence of the PSS may be used repeatedly to make the sequence long. Similarly to the case of the PSS, subcarriers in which the SSS is arranged are also Nsub/2−X−1 to Nsub/2+X in the present example, but the SSS may be arranged differently from the case of the PSS. Moreover, the number of subcarriers in which the SSS is arranged may be increased, for example, the number of subcarriers in which the SSS is arranged may be twice the number of subcarriers in which the PSS is arranged. In the example of FIG. 5, the number of OFDM symbols in which the PSS or the SSS is arranged is one, but there is no limitation to the example, and the number of OFDM symbols in which the PSS is arranged may be M and the number of OFDM symbols in which the SSS is arranged may be N. In this case, M and N are integers equal to or greater than 1 and M and N may have the same value or different values.

The terminal apparatus identifies a cell ID of the ULB base station apparatus by the PSS/SSS and grasps a sequence used for a downlink reference signal to be transmitted after the OFDM symbol in which the SSS is transmitted. In the example of FIG. 5, illustrated is an example in which a reference signal RS is included in an OFDM symbol next to the OFDM symbol in which the SSS is included and the reference signal RS is arranged in all subcarriers that are able to be used in the ULB-CC, but there is no limitation to the example. For example, the number of reference signals RSs to be arranged may be limited to the minimum required number of subcarriers for measurement of the receive power, or the number of subframes in which the reference signal RS is arranged or positions of the subcarriers to be used may be changed for each of ULB base station apparatuses. The OFDM symbol in which the reference signal RS is arranged may not be next to the OFDM symbol in which the SSS is included and may be the OFDM symbol after the next OFDM symbol.

Figure 6:
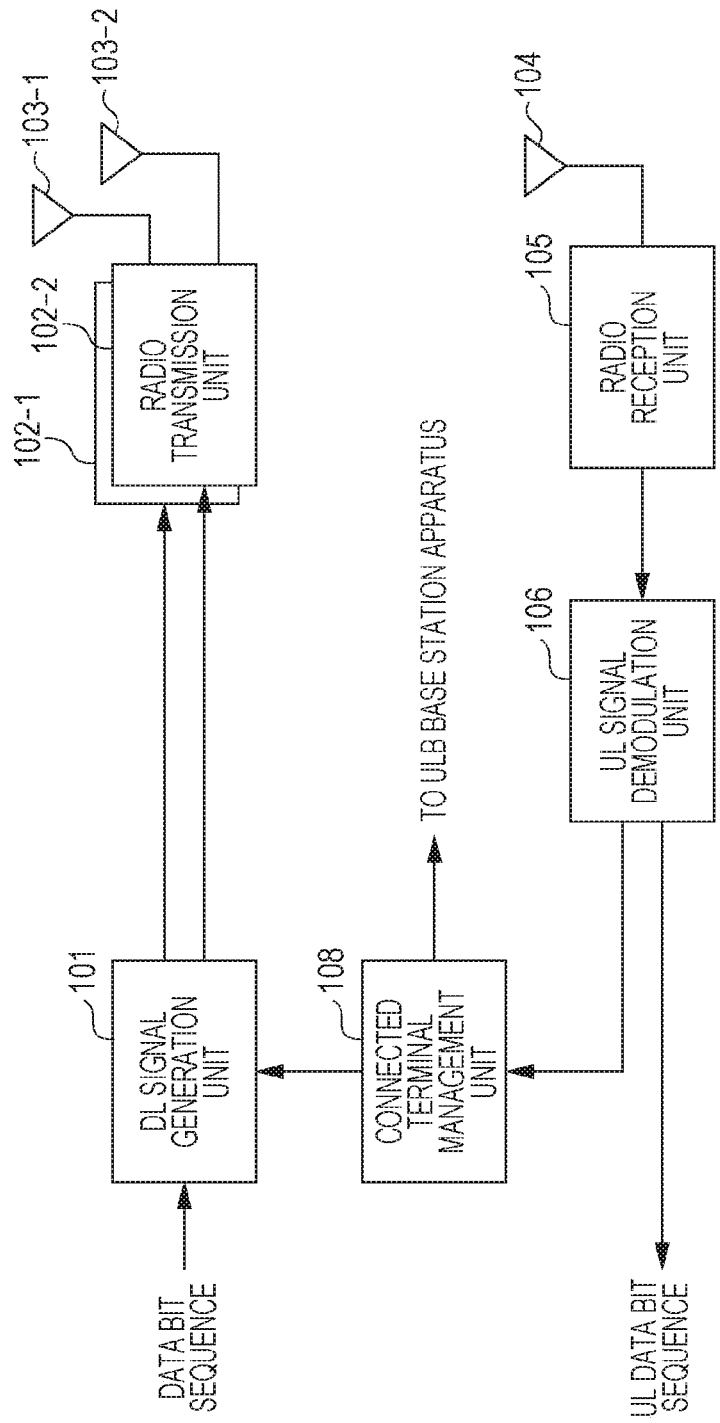
FIG. 6 illustrates an example of a configuration of an LB base station apparatus according to the invention.

FIG. 6 illustrates an example of a configuration of an LB base station apparatus according to the invention. In the figure, minimum blocks required for the invention are illustrated. The LB base station apparatus will be described as a base station apparatus (for example, the macro base station apparatus 10) that performs communication only in the LB-CC of the licensed band, but may have a function of performing communication in the ULB-CC. The LB base station apparatus receives, via a receive antenna 104, control information transmitted on a PUCCH (Physical Uplink Control CHannel) or control information transmitted on a PUSCH (Physical Uplink Shared CHannel) from the terminal apparatus. A radio reception unit 105 down-converts a received signal into a baseband frequency, performs A/D (Analog/Digital) conversion, and inputs a signal, which is obtained by removing CP (Cyclic Prefix) from a digital signal, to a UL signal demodulation unit 106. The UL signal demodulation unit 106 extracts, from the control information from which the CP has been removed, channel quality information (CSI: Channel State Information), an SR (Scheduling Request), ACK/NACK (Acknowledgement/Negative Acknowledgement), an RACH (Random Access CHannel) signal, or the like, and inputs the resultant to a connected terminal management unit 108. Further, the UL signal demodulation unit 106 also extracts information about the receive power measured by the terminal apparatus on the basis of the reference signal from the ULB base station apparatus, and inputs the information to the connected terminal management unit 108. The UL signal demodulation unit 106 demodulates the data signal and detects an uplink data bit sequence.

The connected terminal management unit 108 manages the number of connected terminal apparatuses and information about the terminal apparatuses, for example, such as a data quantity before downlink transmission, and selects a terminal apparatus, which is to be offloaded to the ULB base station apparatus, in accordance with a traffic quantity, information about the receive power measured in the ULB-CC by the terminal apparatus, or the like. Information about the terminal apparatus to be offloaded to the ULB-CC is notified to the ULB base station apparatus. The connected terminal management unit 108 notifies the ULB base station apparatus of a candidate of timing of transmitting a signal for measurement of the receive power in the ULB-CC, and details thereof will be described later. When deciding the terminal apparatus, which is to be offloaded to the ULB-CC, in accordance with the traffic quantity, in order to notify a measurement request of the receive power in the ULB-CC, the connected terminal management unit 108 inputs information about the measurement request to the DL signal generation unit 101 and further performs the notification also to the ULB base station apparatus. In this case, the measurement request information includes information about the terminal apparatus for which the measurement request of the receive power is made, information about the ULB base station apparatus targeted for measurement in a coverage of the LB base station apparatus, a time period in which the signal for measurement of the receive power is transmitted, and the like.

Figure 7:
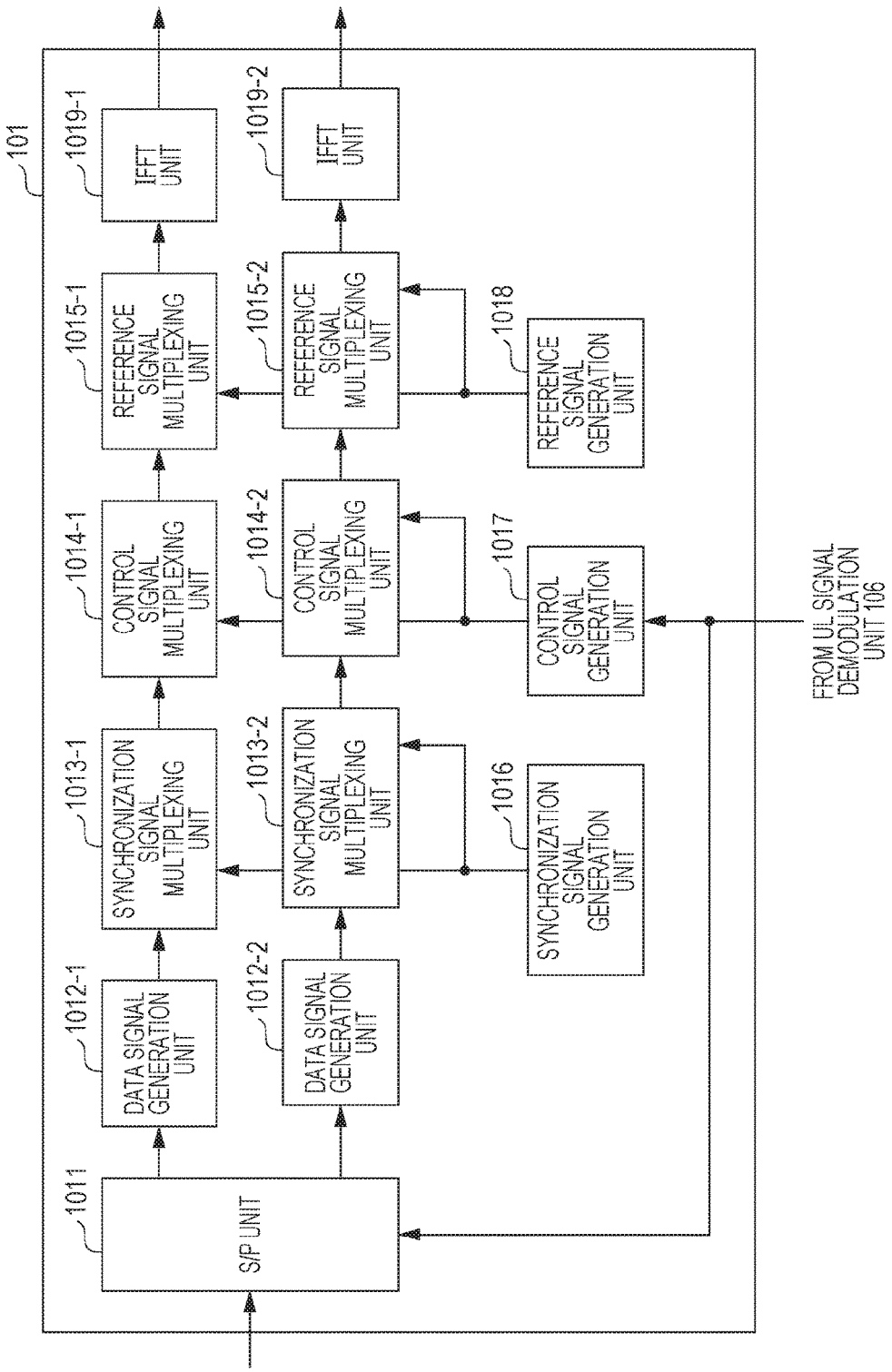
FIG. 7 illustrates an example of a configuration of a DL signal generation unit 101 according to the invention.

FIG. 7 illustrates an example of a configuration of the DL signal generation unit 101 according to the invention. The DL signal generation unit 101 outputs uplink control information from the UL signal demodulation unit 106 to an S/P unit 1011 and a control signal generation unit 1017. The S/P unit 1011 receives an input of ACK/NACK for a previous transmission opportunity from the UL signal demodulation unit 106, and when having received an input of the ACK, divides a new data bit sequence into the number of transmission streams. In this case, the number of streams is one or more. When having received an input of the NACK, the S/P unit 1011 divides a data bit sequence, which is transmitted in the previous transmission opportunity, into the number of transmission streams. Data signal generation units 1012-1 and 1012-2 generate a data transmission signal sequence from the data bit sequence. In this case, processing of the data signal generation units 1012-1 and 1012-2 includes error correction coding, puncturing and modulation based on an MCS (Modulation and Coding Scheme), generation of a signal for each antenna port by multiplication of a precoding matrix, and allocation of a signal sequence to a resource used for the downlink based on resource allocation information. Note that, the resource is constituted as an RB (Resource Block) formed by twelve subcarriers and one subframe or an RBG (Resource Block Group) formed by a group of a plurality of RBs. However, the number of subcarriers forming the resource block is not limited to the aforementioned example, and allocation in a unit of a subcarrier may be performed with one resource block as one subcarrier.

A synchronization signal generation unit 1016 generates PSS/SSS to be transmitted in the LB-CC and inputs the PSS/SSS to synchronization signal multiplexing units 1013-1 and 1013-2. The synchronization signal multiplexing units 1013-1 and 1013-2 multiplex a data transmission signal sequence and the PSS/SSS with the multiplexing method of the LTE system described above. Then, control signal multiplexing units 1014-1 and 1014-2 multiplex a PDCCH (Physical Downlink Control CHannel), an EPD- CCH (Enhanced PDCCH) and the like, which are control signals generated by the control signal generation unit 1017 on the basis of the uplink control information, with a signal in which the synchronization signals and the data transmission signal sequence are multiplexed. When the measurement request of the receive power in the ULB-CC is input from the connected terminal management unit 108, the control signal generation unit 1017 generates control information about the measurement request of the receive power, which is to be notified to the corresponding terminal apparatus. The control information may be information notified by the PDCCH or the EPDCCH, or RRC (Radio Resource Control) which is a control signal of a higher layer. Reference signals of the downlink generated at a reference signal generation unit 1018, for example, such as a CRS (Cell-Specific Reference Signal), a CSI-RS (Channel State Information Reference Signal), and a DMRS (De-Modulation Reference Signal), are input to reference signal multiplexing units 1015-1 and 1015-2, and multiplexed with outputs from the control signal multiplexing units 1014-1 and 1014-2. IFFT units 1019-1 and 1019-2 perform IFFT (Inverse Fast Fourier Transform) to thereby transform the signal sequence from a frequency domain signal sequence to a time domain signal sequence.

Radio transmission units 102-1 and 102-2 insert CP in the time domain signal sequence, converts the resultant into an analog signal through D/A (Digital/Analog) conversion, and up-converts the converted signal into a radio frequency used for transmission. The radio transmission units 102-1 and 102-2 amplify the up-converted signal by a PA (Power Amplifier) and transmit the amplified signal via transmit antennas 103-1 and 103-2. As described above, in the downlink, an OFDM (Orthogonal Frequency Division Multiplexing) signal is transmitted to the terminal apparatus. However, the number of transmit antennas is two in the example of FIG. 6, but the number is not limited thereto and may be any as long as being one or more.

Figure 8:
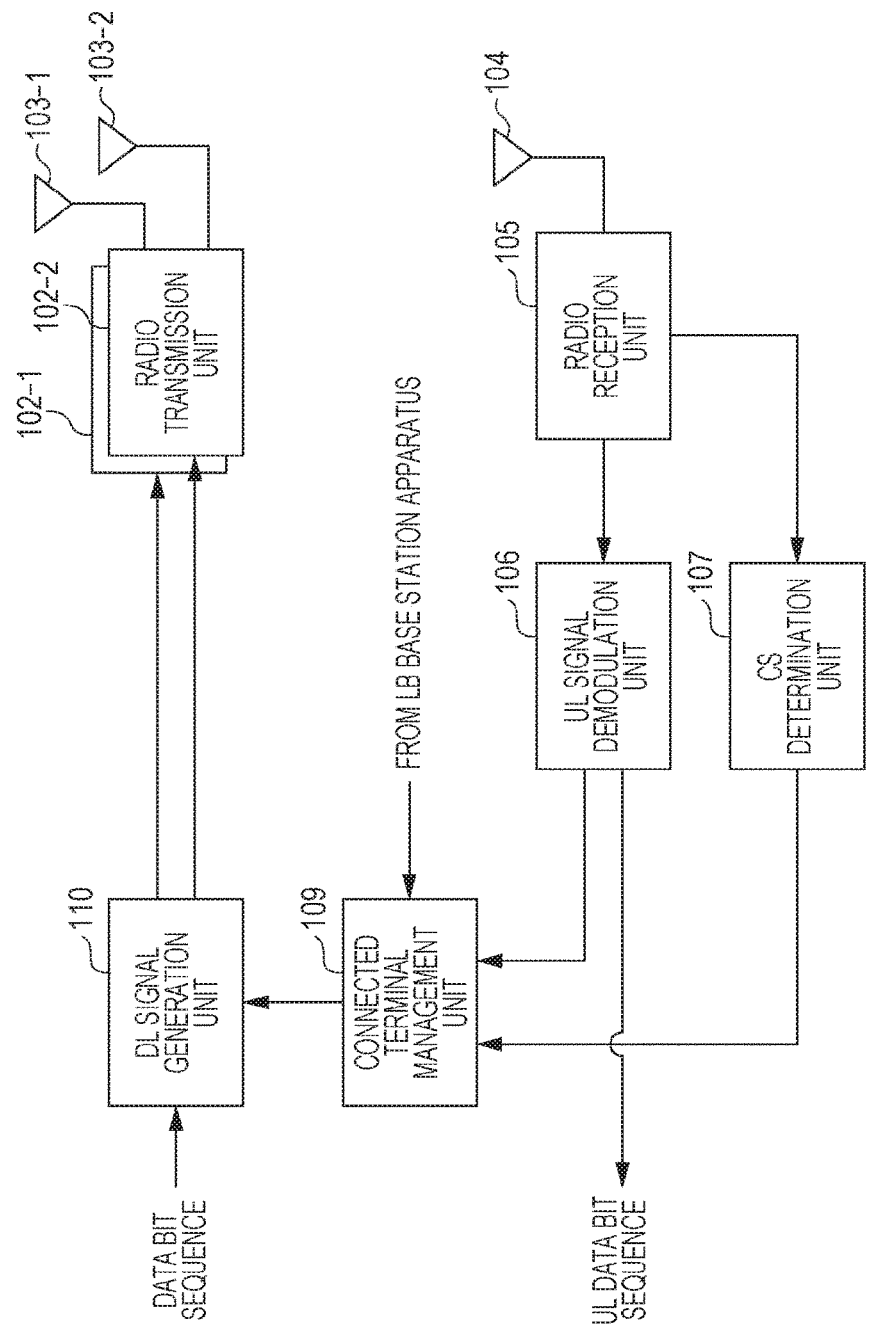
FIG. 8 illustrates an example of a configuration of a ULB base station apparatus according to the invention.

FIG. 8 illustrates an example of a configuration of a ULB base station apparatus according to the invention. In the figure, minimum blocks required for the invention are illustrated. FIG. 8 indicates a configuration example similar to that of the LB base station apparatus of FIG. 6 except for a CS determination unit 107, a connected terminal management unit 109, and a DL signal generation unit 110, so that only different processing will be described and description for similar processing will be omitted. The CS determination unit 107 needs to perform carrier sense before data transmission in the ULB-CC, and hence determines whether or not another system uses the ULB-CC in accordance with reception input from the radio reception unit 105 and inputs a result to the connected terminal management unit 109. When measurement request information about the receive power in the ULB-CC is notified from the LB base station apparatus, the connected terminal management unit 109 inputs, to the DL signal generation unit 110, a transmission request of a signal for measurement of the receive power to the terminal apparatus, and the transmission request will be described later. When information about the terminal apparatus to be offloaded to the ULB-CC is notified from the LB base station apparatus, the connected terminal management unit 109 considers that the ULB-CC is activated for the corresponding terminal apparatus by the LB base station apparatus and inputs, to the DL signal generation unit 110, control information for performing data transmission of the downlink.

Figure 9:
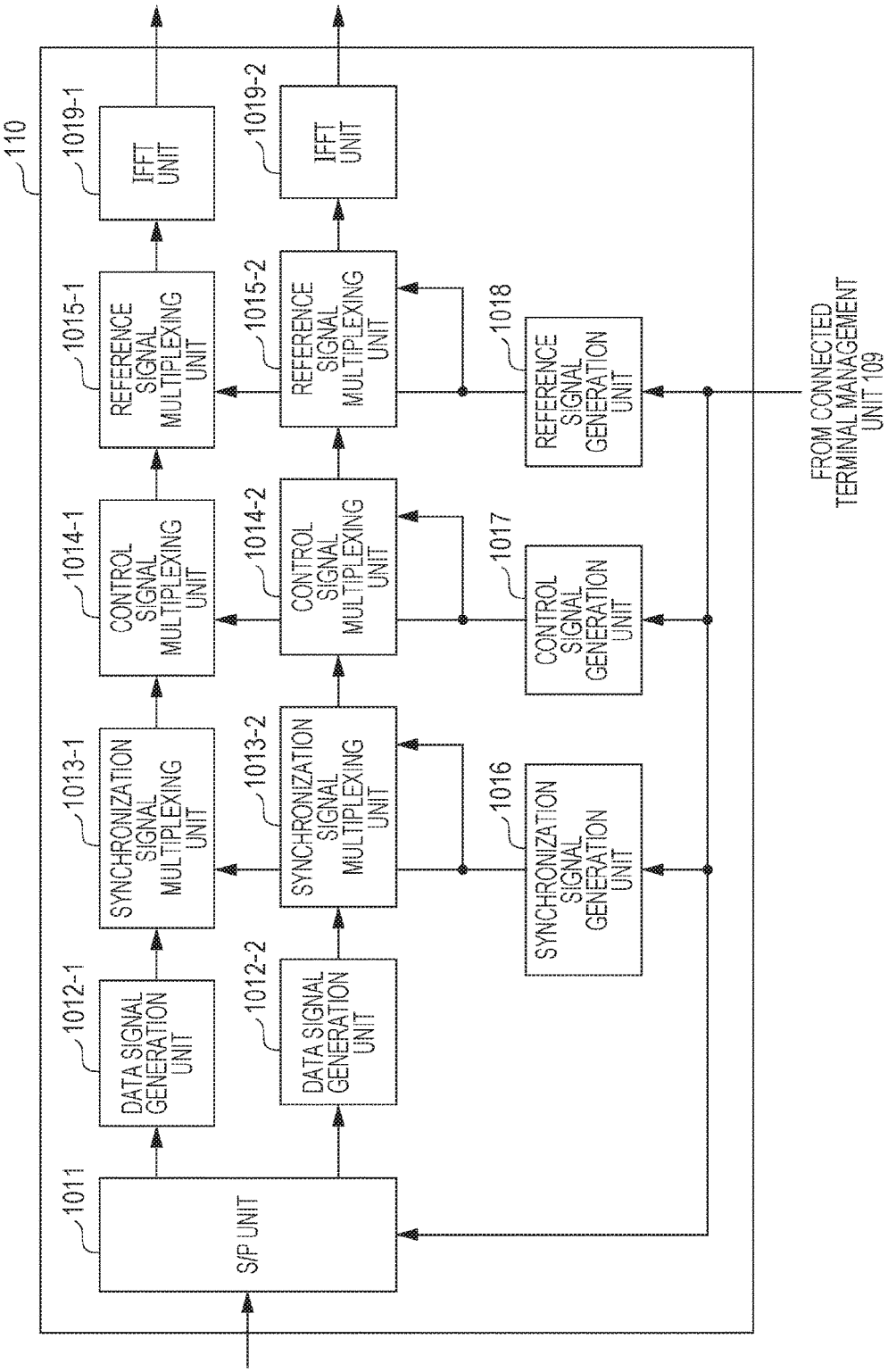
FIG. 9 illustrates an example of a configuration of a DL signal generation unit 110 according to the invention.

FIG. 9 illustrates an example of a configuration of the DL signal generation unit 110 according to the invention. In the DL signal generation unit 110, information about the terminal apparatus performing data transmission of the downlink, which is input from the connected terminal management unit 109, is input to a control signal generation unit 1107. The control signal generation unit 1107 generates a control signal similarly to the control signal generation unit 1017 of FIG. 7. In a case where the control signal is not transmitted in the ULB-CC, however, the DL signal generation unit 110 may not include the control signal generation unit 1107. In the DL signal generation unit 110, a transmission request of a signal for measurement of the receive power in the ULB-CC is also input from the connected terminal management unit 109 and input to a synchronization signal generation unit 1106 and a reference signal generation unit 1108. In this case, the synchronization signal generation unit 1106 and the reference signal generation unit 1108 generate synchronization signals and reference signals by which the configuration example of the subframe of FIG. 5 is realized. The generated synchronization signals and reference signals are respectively multiplexed in the synchronization signal multiplexing units 1013-1 and 1013-2 and the reference signal multiplexing units 1015-1 and 1015-2 as in the configuration example of the subframe of FIG. 5. Subsequent processing is similar to the processing of the LB base station apparatus of FIG. 6 and data transmission of the downlink is performed to the terminal apparatus offloaded by the LB base station apparatus.

Figure 10:
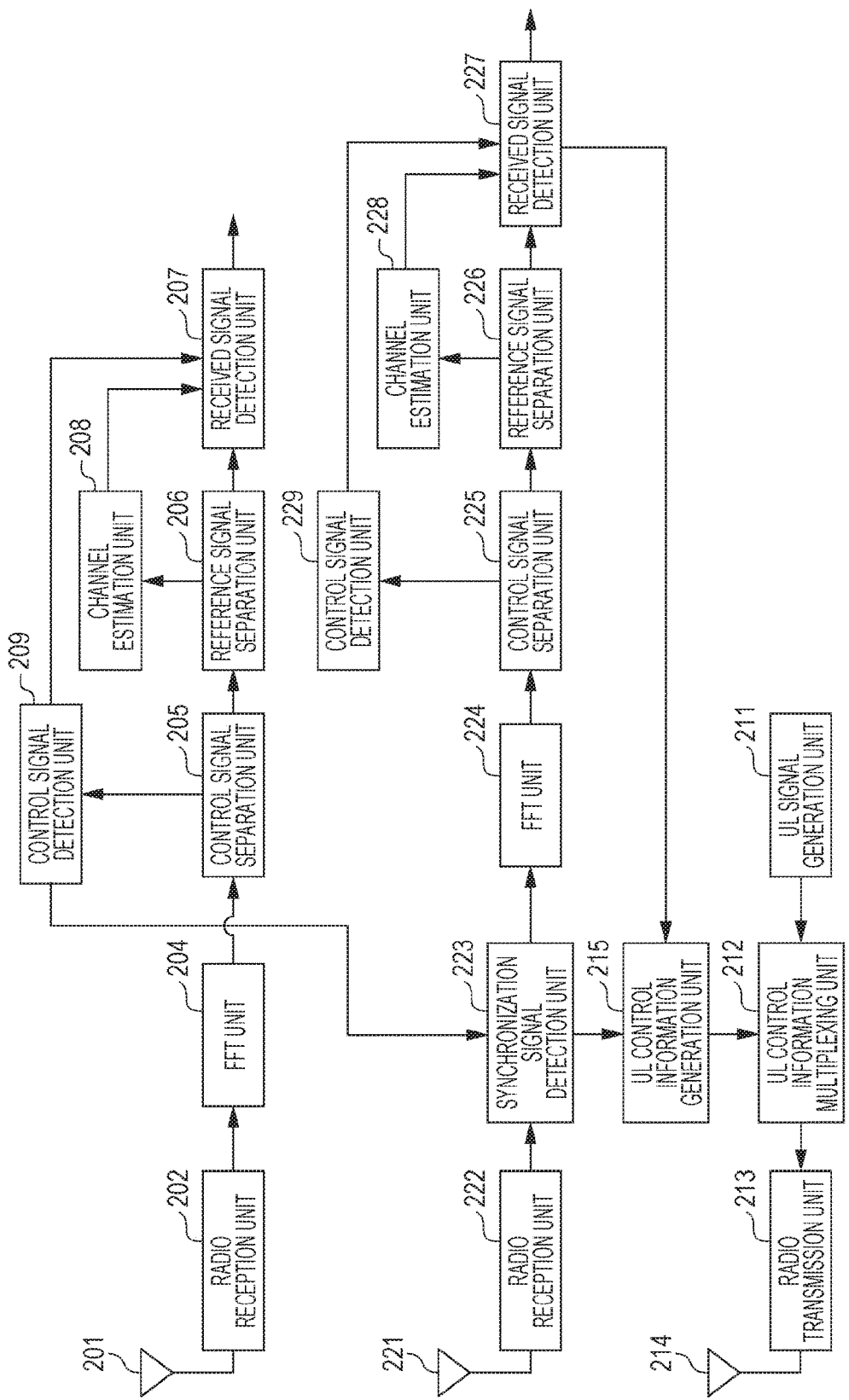
FIG. 10 illustrates an example of a configuration of a terminal apparatus according to the invention.

FIG. 10 illustrates an example of a configuration of a terminal apparatus according to the invention. In the figure, minimum blocks required for the invention are illustrated. In FIG. 10, the number of receive antennas of the terminal apparatus is one, but may be plural. In the terminal apparatus, a signal of the LB-CC is received by a receive antenna 201. A radio reception unit 202 down-converts the received signal into a baseband frequency and performs A/D conversion for the down-converted signal to thereby generate a digital signal. Further, the radio reception unit 202 inputs a signal, which is obtained by removing CP from the digital signal, to an FFT unit 204.

The FFT unit 204 transforms a received signal sequence, which is input, from a time domain signal sequence to a frequency domain signal sequence by Fast Fourier Transform, and inputs the frequency domain signal sequence to a control signal separation unit 205. The control signal separation unit 205 separates a signal transmitted by the PDCCH or the EPDCCH and inputs the signal to a control signal detection unit 209. Also when receiving a signal of RRC (Radio Resource Control), the control signal separation unit 205 separates the signal and inputs the signal to the control signal detection unit 209. By blind decoding, the control signal detection unit 209 detects a DCI (Downlink Control Information) format which is transmitted by the PDCCH or the EPDCCH and addressed to the terminal apparatus. The control signal detection unit 209 detects the signal of the RRC. The control signal detection unit 209 inputs detected control information to a received signal detection unit 207. In this case, when a measurement request of the receive power in the ULB-CC is detected by the control information about the LB-CC, the control signal detection unit 209 performs input to a synchronization signal detection unit 223.

A reference signal separation unit 206 separates the input signal to a reference signal and a data signal and inputs each of them to a channel estimation unit 208 and the received signal detection unit 207. The channel estimation unit 208 estimates a frequency response of a channel by using the CRS, the CSI-RS, or the DMRS, which is the input reference signal, and inputs the frequency response estimated for demodulation to the received signal detection unit 207. Though not illustrated, the channel estimation unit 208 inputs channel quality information (CSI) estimated by the CRS or the CSI-RS to a UL control information generation unit 215 in order to notify (report) it to the base station apparatus periodically or aperiodically. The received signal detection unit 207 detects the data signal of the downlink. The received signal detection unit 207 performs equalization processing based on the frequency response of the channel, demodulation processing based on a modulation scheme notified by the DCI format, and error correction decoding processing of an LLR (Log Likelihood Ratio) of a bit sequence obtained by demodulation based on information about the error correction coding notified by the DCI format. The received signal detection unit 207 performs hard decision of the decoded LLR sequence, and when there is no error as a result of cyclic redundancy check (CRC), outputs a bit sequence. Though not illustrated, the received signal detection unit 207 inputs presence/absence of an error in the received data to the UL control information generation unit 215. Information thereof is used for transmission of ACK/NACK.

A signal of the ULB-CC is received by a receive antenna 221. Similarly to the radio reception unit 202, a radio reception unit 222 down-converts the received signal, performs A/D conversion, and inputs the signal, from which CP has been removed, to the synchronization signal detection unit 223. The synchronization signal detection unit 223 performs detection of PSS/SSS transmitted from the ULB base station apparatus in a time period described later. The PSS/SSS transmitted by the ULB base station apparatus are transmitted as in the configuration example of the subframe of FIG. 5. The synchronization signal detection unit 223 identifies a cell ID by performing the detection of the PSS/SSS, performs reception processing of a reference signal, which is transmitted after the PSS/SSS, and measures the receive power. The synchronization signal detection unit 223 inputs information about the measured receive power to the UL control information generation unit 215, and when a data signal is received in the ULB-CC, performs input to the FFT unit 224. The FFT unit 224 transforms a received signal sequence, which is input, from a time domain signal sequence to a frequency domain signal sequence by Fast Fourier Transform, and inputs the frequency domain signal sequence to a control signal separation unit 225. The control signal separation unit 225 performs separation into a control signal transmitted in the ULB-CC and a data signal and inputs each of them to a control signal detection unit 229 and a reference signal separation unit 226. Though description has been given by assuming that the control signal is transmitted in the ULB-CC in the present embodiment, the control signal of the downlink may be transmitted only in the LB-CC. When the control signal of the downlink is transmitted only in the LB-CC, the control signal separation unit 225 and the control signal detection unit 229 are not required, and a control signal for data transmission of the downlink in the ULB-CC is transmitted in the LB-CC and is thus detected by the control signal detection unit 209 and input to a received signal detection unit 227. Processing after the reference signal separation unit 226 is similar to that of the reference signal separation unit 206, which is reception processing of the LB-CC, so that description thereof will be omitted.

A UL signal generation unit 211 transforms a data signal transmitted in the LB-CC of the uplink into a DFTS-OFDM (Discrete Fourier Transform Spread OFDM, also referred to as SC-FDMA) signal. Note that, the DFTS-OFDM is used in the present embodiment, but there is no limitation thereto and a multicarrier signal such as OFDM or MC-CDMA may be used. Processing applied in the UL signal generation unit 211 includes error correction coding, modulation, DFT, frequency resource allocation, IFFT, and the like. To the UL control information generation unit 215, information about ACK/NACK in response to the downlink data of the LB-CC and the ULB-CC is input from the received signal detection unit 207 and the received signal detection unit 227, and further, though not illustrated, information about the CSI of the LB-CC and the ULB-CC is input from the channel estimation unit 208 and a channel estimation unit 228. The UL control information generation unit 215 transforms the ACK/NACK and periodic CSI into a format of UCI (Uplink Control Information) transmitted by the PUCCH and inputs the resultant to a UL control information multiplexing unit 212. Information about the receive power measured on the basis of the notification of the measurement request of the receive power in the ULB-CC is input from the synchronization signal detection unit 223 to the UL control information generation unit 215. The UL control information generation unit 215 generates a signal for reporting the measurement result of the measured receive power of the ULB-CC and inputs the signal to the UL control information multiplexing unit 212. The UL control information multiplexing unit 212 allocates the signal for reporting to a resource of the PUCCH or the PUSCH. When a plurality of pieces of receive power of the ULB-CC are measured, only the receive power of a cell ID and a channel with the receive power exceeding a threshold which is set in advance may be reported or only the receive power of the predetermined number of cell IDs and channels may be reported.

The UL control information multiplexing unit 212 multiplexes data of the uplink and control information. When the PUSCH and the PUCCH are not transmitted simultaneously, however, a transmission frame is formed by only a signal of either the PUSCH or the PUCCH. When making a resource allocation request of the uplink, the UL control information generation unit 215 generates and transmits an SR or RACH signal. In this case, the SR is transmitted by the PUCCH and the RACH signal uses a predetermined resource. The uplink signal is transmitted through a radio transmission unit 213 and a transmit antenna 214.

Figure 11:
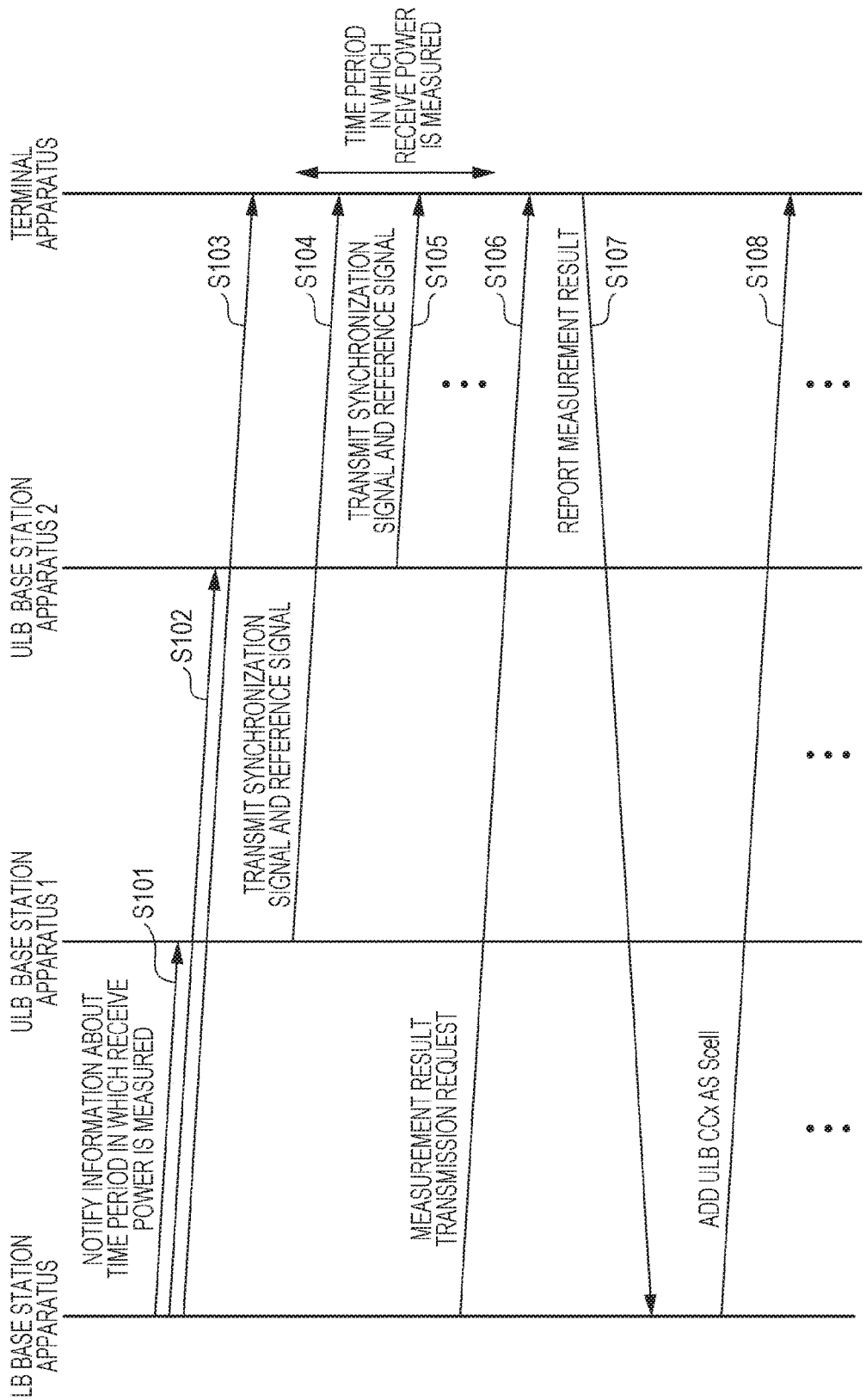
FIG. 11 illustrates an example of a sequence chart of a report of receive power according to the invention.

FIG. 11 illustrates an example of a sequence chart of a report of receive power according to the invention. FIG. 11 will be described with an example in which the number of ULB base station apparatuses is two. First, for deciding a terminal apparatus that offloads traffic to the ULB base station apparatuses, the LB base station apparatus notifies a ULB base station apparatus 1 and a ULB base station apparatus 2 of notification of a measurement request of receive power in the ULB-CC for the terminal apparatus (S101, S102). In this case, communication between the LB base station apparatus and each of the ULB base station apparatuses may be performed by using an X2 interface or other means. The notification of the measurement request of the receive power in the ULB-CC for the terminal apparatus includes information about a time period in which the terminal apparatus measures the receive power, and a synchronization signal and a reference signal are transmitted within this time period with the configuration example of the subframe of FIG. 5.

Here, at conventional timing of transmitting the synchronization signal, the synchronization signal is transmitted in a specific OFDM of a specific subframe (1 msec) as described above (FIGS. 2 to 4), whereas at timing of transmitting the synchronization signal in the ULB-CC of the present embodiment, the synchronization signal may be transmitted in a plurality of subframes designated by the LB base station apparatus. For example, a time period of five subframes (5 msec), a time period of ten subframes (10 msec), a time period of twenty subframes (20 msec), or the like is designated. However, there is no limitation to such an example and a time period of a few OFDM symbols or the like may be designated. Since the synchronization signal is not able to be transmitted when the ULB-CC is used by another system, by designating such a time period in which the synchronization signal is transmitted in the ULB-CC, flexible transmission timing according to a usage state of the ULB-CC is able to be achieved. Since a time period in which the synchronization signal is received in the ULB-CC is notified, the terminal apparatus is only required to detect the synchronization signal only in the designated time period so that load of detection processing is reduced.

The notification of the measurement request of the receive power in the ULB-CC for the terminal apparatus may include channel information about the ULB-CC, and when a plurality of channels exist as the ULB-CC, for example, the LB base station apparatus may designate a channel in which the synchronization signal and the reference signal are transmitted.

As a candidate of the terminal apparatus that offloads traffic to the ULB base station apparatuses, the LB base station apparatus transmits notification of the measurement request of the receive power in the ULB-CC to a part or all of terminal apparatuses connected to the LB base station apparatus (S103). When notifying each of the terminal apparatuses of the measurement request of the receive power in the ULB-CC, the notification may be performed by the PDCCH or the EPDCCH or the notification may be performed by a control signal of a higher layer, for example, the RRC or the like. The notification of the measurement request of the receive power in the ULB-CC, which is received by the terminal apparatus, includes information about the aforementioned time period in which the receive power is measured, and a cell ID of the ULB base station apparatus that transmits the synchronization signal and the reference signal for measurement of the receive power. The notification of the measurement request of the receive power in the ULB-CC, which is received by the terminal apparatus, may include channel information by which the signal for measurement of the receive power in the ULB-CC is transmitted.

The ULB base station apparatus 1 and the ULB base station apparatus 2 perform carrier sense so as to avoid collision with another ULB base station apparatus or another system that uses the same channel at the time of transmission in the ULB-CC, and after determining that transmission is able to be performed in the ULB-CC, transmit the synchronization signal and the reference signal on the basis of the information included in the notification of the measurement request of the receive power in the ULB-CC for the terminal apparatus (S104, S105). The synchronization signal and the reference signal transmitted by each of the ULB base station apparatuses are multiplexed, for example, with the configuration example of the subframe of FIG. 5. Though FIG. 11 indicates an example in which each of the ULB base station apparatuses performs the transmission only once with the configuration example of the subframe of FIG. 5, a specific ULB base station apparatus may perform the transmission plural times and the number of times of the transmission may be different between the ULB base station apparatuses. The terminal apparatus performs processing in the ULB-CC for detecting the synchronization signal of a cell ID notified in the time period in which the receive power is measured, and when having detected the synchronization signal, performs measurement of the receive power. After the time period in which the receive power is measured, which is designated by the notification of the measurement request of the receive power in the ULB-CC, ends, the LB base station apparatus transmits a measurement result transmission request to the terminal apparatus (S106). The terminal apparatus transmits the measurement result to the LB base station apparatus with the method described above (S107). The LB base station apparatus receives measurement results from a plurality of terminal apparatuses, and decides, by the connected terminal management unit 108, the terminal apparatus that offloads traffic to the ULB-CC. The LB base station apparatus transmits, to the terminal apparatus that offloads traffic to the ULB-CC, a control signal for activating a ULB-CCx of an offload destination as an SCell (S108).

Though description has been given for the example in which each of the ULB base station apparatuses starts the transmission after the carrier sense in the present embodiment, the ULB base station apparatus may transmit RTS (Request to Send) or CTS (Clear to Send)-to-self before transmission of the downlink. In this case, NAV (Network Allocation Vector) may be configured to the RTS. In a case where a signal observed by the carrier sense is the synchronization signal of the ULB base station apparatus, a signal length of an interference signal is found, so that communication may be started immediately after the synchronization signal ends. In a case where the signal observed by the carrier sense is the synchronization signal of the ULB base station apparatus, the transmission may be started even when a CCA (Clear Channel Assessment) level is exceeded. In this case, resources used for transmission of the synchronization signal may be shared in advance between the ULB base station apparatuses so that the resources are different from each other. In the present embodiment, the synchronization signal used for identification of the cell ID of the ULB-CC is the PSS/SSS, but may be a different signal, and a reference signal such as the CRS, the CSI-RS, or the DMRS may be used, a DRS (Discovery Reference Signal), a PRS (Positioning Reference Signal), or the like may be used, or a known signal of a training symbol or the like may be transmitted.

Note that, timing when the time period in which the receive power is measured is applied after the terminal apparatus receives notification of the time period in which the receive power is measured may be started from timing when control information is received or may be started from a predetermined time (for example, such as after 4 msec).

Though description has been given in the present embodiment for the example in which the time period in which the receive power received by the terminal apparatus is measured is notified, cycles of the time period in which the receive power is measured and a time period in which the receive power is not measured may be notified, for example, during one frame (formed by ten subframes), four subframes are set as the time period in which the receive power is measured and the others are set as the time period in which the receive power is not measured. With such designation, the time period in which the receive power is measured and the time period in which the receive power is not measured are repeated periodically. The time period in which the receive power is measured does not need to be continuous subframes, and discontinuous subframes may be designated. In this case, control information indicating, with bitmap, subframes in which the receive power is measured among subframes in one frame is notified to the terminal apparatus.

As described above, in the present embodiment, when deciding the terminal apparatus that offloads traffic to the ULB-CC, the LB base station apparatus notifies the terminal apparatus of the time period in which the receive power in the ULB-CC is measured and notifies the ULB base station apparatus to transmit the synchronization signal and the reference signal for measurement of the receive power in the time period in which the receive power is measured. When the ULB base station apparatus transmits the synchronization signal and the reference signal for measurement of the receive power in the time period in which the receive power is measured in the terminal apparatus, the terminal apparatus is able to efficiently measure the receive power in the ULB-CC.

(Second Embodiment)

In the present embodiment, configuration examples of the LB base station apparatus, the ULB base station apparatus, and the terminal apparatus are similar to those of the first embodiment and are respectively illustrated in FIG. 6, FIG. 8, and FIG. 10. Configuration examples of the DL signal generation unit 101 of the LB base station apparatus and the DL signal generation unit 110 of the ULB base station apparatus are also similar to those of the first embodiment and are respectively illustrated in FIG. 7 and FIG. 9. Thus, in the present modified example, only different processing will be described and description for similar processing will be omitted.

Figure 12:
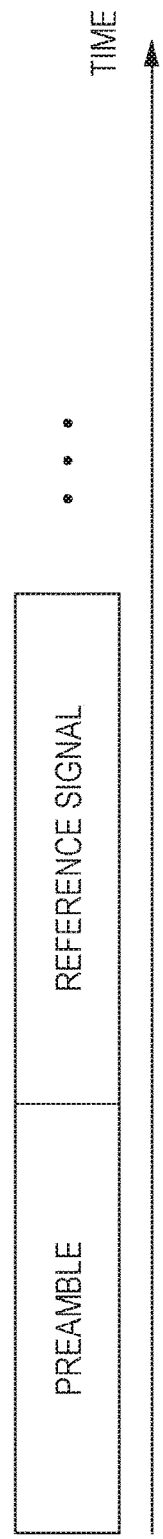
FIG. 12 illustrates an example of a configuration of a subframe transmitted by a ULB base station apparatus according to the invention.

FIG. 12 illustrates an example of a configuration of a subframe transmitted by the ULB base station apparatus of the present embodiment. Though the PSS/SSS as the synchronization signals and the reference signal are transmitted as the signals for measurement of the receive power in the ULB-CC in the aforementioned embodiment, an example in which a preamble sequence and a reference signal are transmitted will be described in the present embodiment. As the preamble sequence, different sequences are used depending on a cell ID, and, for example, a sequence generated by using a cell ID as a seed of a scramble sequence with a generating polynomial of the preamble sequence made known by transmission and reception is used. The terminal apparatus identifies the cell ID by detecting the preamble sequence with the synchronization signal detection unit 223. The terminal apparatus further performs, by the synchronization signal detection unit 223, reception processing of the reference signal transmitted after the preamble sequence and performs measurement of the receive power. In this case, the reference signal uses different sequences and different resources in accordance with the cell ID.

Figure 13:
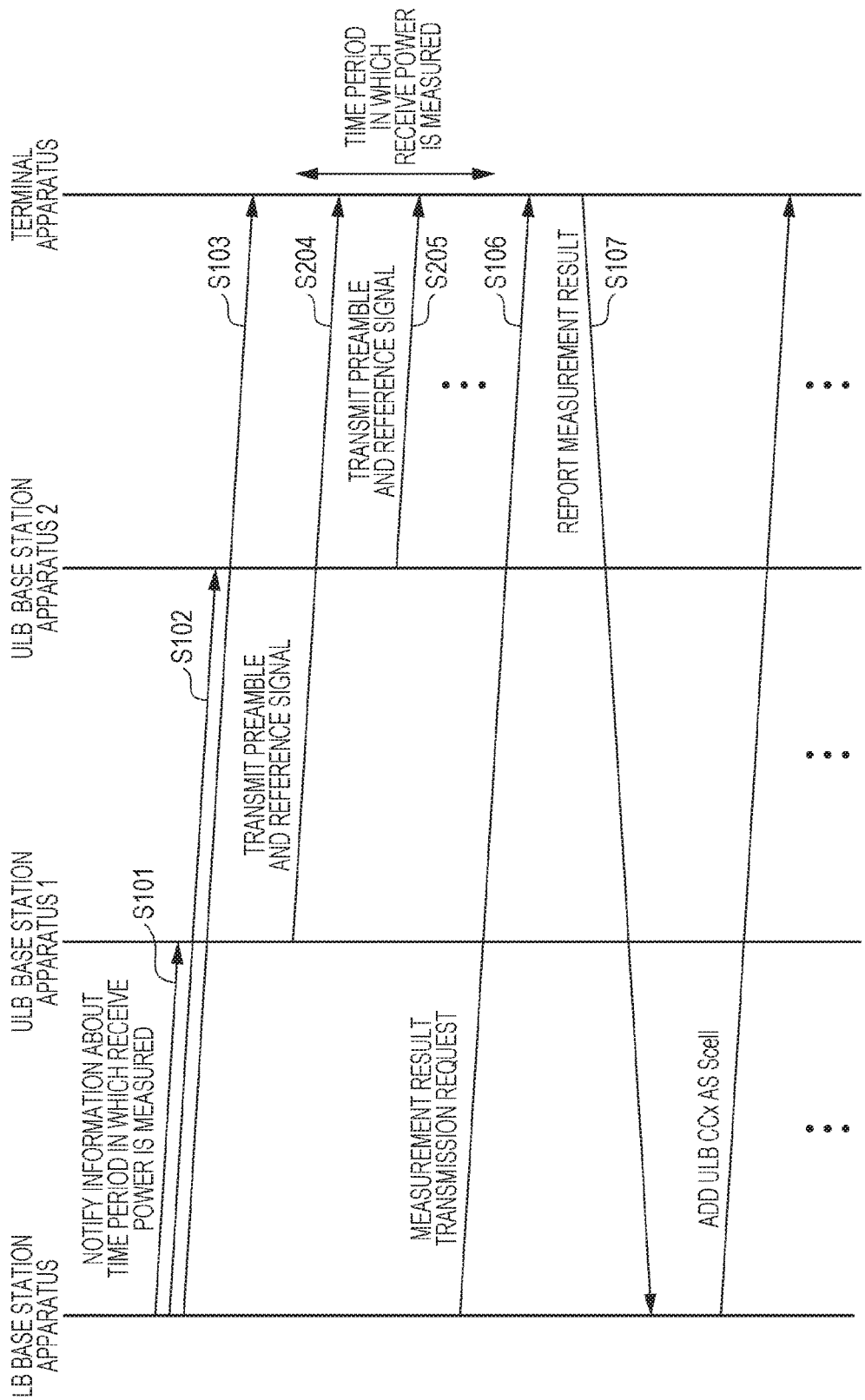
FIG. 13 illustrates an example of a sequence chart of a report of receive power according to the invention.

FIG. 13 illustrates an example of a sequence chart of a report of receive power according to the invention. In FIG. 13, description will be given with an example in which the number of ULB base station apparatuses is two. First, in order to decide a terminal apparatus that offloads traffic to the ULB base station apparatuses, the LB base station apparatus notifies the ULB base station apparatus 1 and the ULB base station apparatus 2 of notification of a measurement request of the receive power in the ULB-CC for terminal apparatus (S101, S102). In this case, communication between the LB base station apparatus and each of the ULB base station apparatuses may be performed by using an X2 interface or other means. The notification of the measurement request of the receive power in the ULB-CC for the terminal apparatus includes, similarly to the aforementioned embodiment, information about the time period in which the terminal apparatus measures the receive power, and the preamble and the reference signal are transmitted within this time period as in FIG. 12. The notification of the measurement request of the receive power in the ULB-CC for the terminal apparatus may include channel information about the ULB-CC, and when a plurality of channels exist as the ULB-CC, for example, the LB base station apparatus may designate a channel in which the preamble and the reference signal are transmitted.

The LB base station apparatus transmits notification of the measurement request of the receive power in the ULB-CC to a part or all of terminal apparatuses connected to the LB base station apparatus as a candidate of the terminal apparatus that offloads traffic to the ULB base station apparatuses (S103). When notifying each of the terminal apparatuses of the measurement request of the receive power in the ULB-CC, the notification may be performed by the PDCCH or the EPDCCH of the LB-CC or the notification may be performed by a control signal of a higher layer, for example, the RRC or the like. The notification of the measurement request of the receive power in the ULB-CC, which is received by the terminal apparatus, includes information about the aforementioned time period in which the receive power is measured, and a cell ID of the ULB base station apparatus that transmits the preamble and the reference signal for measurement of the receive power. The notification of the measurement request of the receive power in the ULB-CC, which is received by the terminal apparatus, may also include information about a channel in which the signal for measurement of the receive power in the ULB-CC is transmitted.

The ULB base station apparatus 1 and the ULB base station apparatus 2 perform carrier sense so as to avoid collision with another ULB base station apparatus or another system that uses the same channel at the time of transmission in the ULB-CC, and after determining that transmission is able to be performed in the ULB-CC, transmit the preamble and the reference signal on the basis of the information included in the notification of the measurement request of the receive power in the ULB-CC for the terminal apparatus (S204, S205). The preamble and the reference signal transmitted by each of the ULB base station apparatuses are transmitted as in FIG. 12. Though FIG. 13 indicates an example in which each of the ULB base station apparatuses performs the transmission only once as in FIG. 12, a specific ULB base station apparatus may perform the transmission plural times and the number of times of the transmission may be different between the ULB base station apparatuses. The terminal apparatus performs processing in the ULB-CC for detecting the preamble of a cell ID notified in the time period in which the receive power is measured, and when having detected the preamble, performs measurement of the receive power. After the time period in which the receive power is measured, which is designated by the notification of the measurement request of the receive power in the ULB-CC, ends, the LB base station apparatus transmits a measurement result transmission request to the terminal apparatus (S106). The terminal apparatus transmits the measurement result to the LB base station apparatus with the method described above (S107). The LB base station apparatus receives measurement results from a plurality of terminal apparatuses, and decides, by the connected terminal management unit 108, the terminal apparatus that offloads traffic to the ULB-CC. The LB base station apparatus transmits, to the terminal apparatus that offloads traffic to the ULB-CC, a control signal for activating a ULB-CCx of an offload destination as an SCell (S108).

Though description has been given for the example in which each of the ULB base station apparatuses performs the transmission after the carrier sense in the present embodiment, the ULB base station apparatus may transmit RTS (Request to Send) or CTS (Clear to Send)-to-self before transmission of the downlink. In this case, NAV (Network Allocation Vector) may be configured to the RTS.

Note that, timing when the time period in which the receive power is measured is applied after the terminal apparatus receives notification of the time period in which the receive power is measured may be started from timing when control information is received or may be started from a predetermined time (for example, such as after 4 msec).

Though description has been given in the present embodiment for the example in which the time period in which the receive power received by the terminal apparatus is measured is notified, cycles of the time period in which the receive power is measured and a time period in which the receive power is not measured may be notified, for example, during one frame (formed by ten subframes), four subframes are set as the time period in which the receive power is measured and the others are set as the time period in which the receive power is not measured. With such designation, the time period in which the receive power is measured and the time period in which the receive power is not measured are repeated periodically. The time period in which the receive power is measured does not need to be continuous subframes, and discontinuous subframes may be designated. In this case, control information indicating, with bitmap, subframes in which the receive power is measured among subframes in one frame is notified to the terminal apparatus.

As described above, in the present embodiment, when deciding the terminal apparatus that offloads traffic to the ULB-CC, the LB base station apparatus notifies the terminal apparatus of the time period in which the receive power in the ULB-CC is measured and notifies the ULB base station apparatus to transmit the preamble and the reference signal for measurement of the receive power in the time period in which the receive power is measured. When the ULB base station apparatus transmits the synchronization signal and the reference signal for measurement of the receive power in the time period in which the receive power is measured in the terminal apparatus, the terminal apparatus is able to efficiently measure the receive power in the ULB-CC.

(Third Embodiment)

In the present embodiment, configuration examples of the LB base station apparatus, the ULB base station apparatus, and the terminal apparatus are similar to those of the first embodiment and are respectively illustrated in FIG. 6, FIG. 8, and FIG. 10. Configuration examples of the DL signal generation unit 101 of the LB base station apparatus and the DL signal generation unit 110 of the ULB base station apparatus are also similar to those of the first embodiment and are respectively illustrated in FIG. 7 and FIG. 9. Thus, in the present modified example, only different processing will be described and description for similar processing will be omitted.

Figure 14:
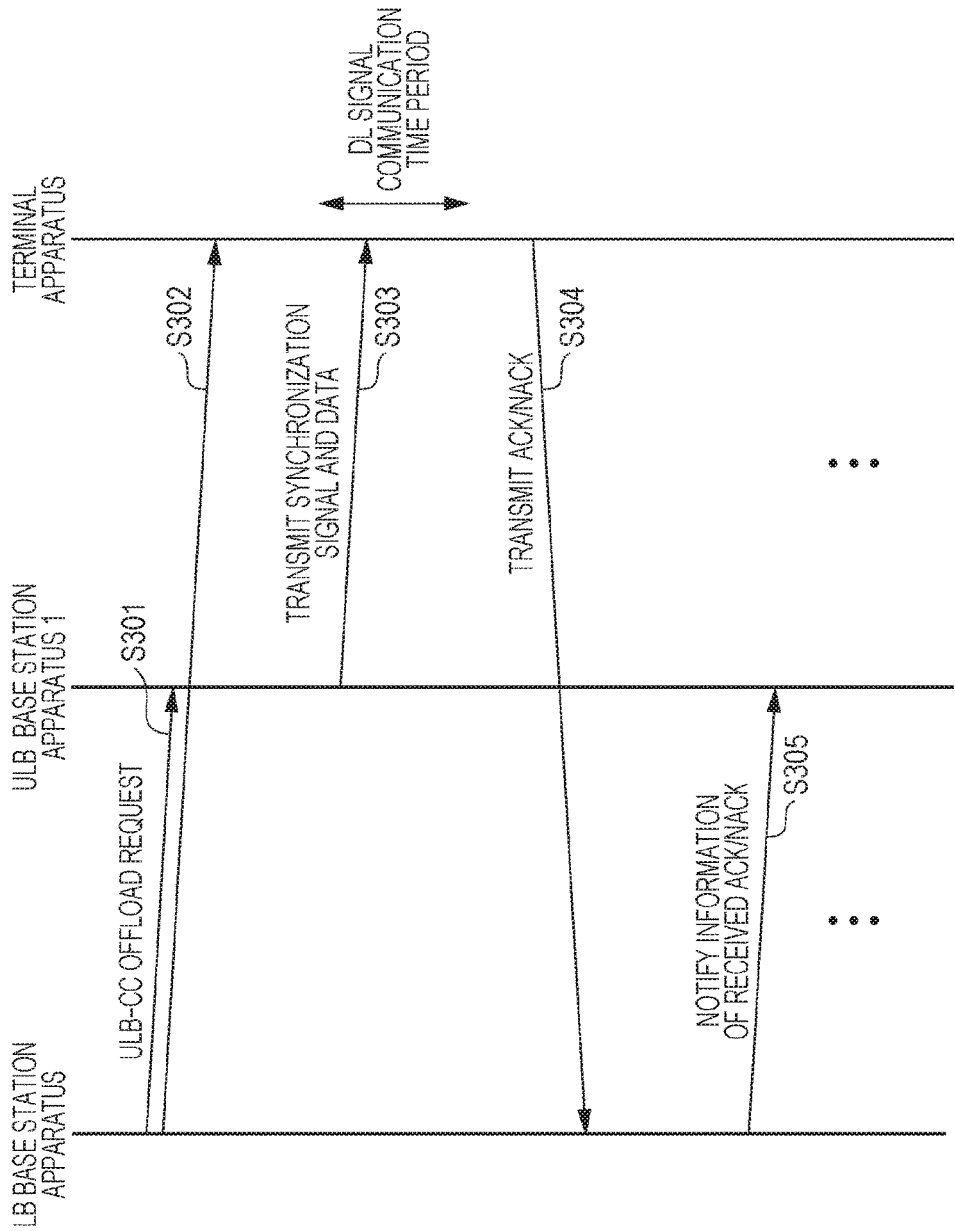
FIG. 14 illustrates an example of a sequence chart according to the invention.

FIG. 14 illustrates an example of a sequence chart according to the invention. FIG. 14 indicates an example in which the number of ULB base station apparatuses is one and indicates a case where the LB base station apparatus does not notify a measurement request of receive power in the ULB-CC but notifies a ULB-CC offload request to a terminal apparatus that offloads traffic to the ULB-CC. First, the LB base station apparatus decides, by the connected terminal management unit 108, a terminal apparatus that offloads traffic to the ULB base station apparatus and notifies the ULB base station apparatus 1 of a ULB-CC offload request (S301). In this case, it is assumed that the LB base station apparatus decides a terminal apparatus, which is to be offloaded to the ULB-CC, in accordance with a traffic quantity, channel quality of the LB-CC, or the like. For example, a user not requiring low delay and associated with high traffic or a user providing low channel quality in the LB-CC is connected to the ULB-CC. As an example of deciding to which ULB-CC the terminal apparatus that is offloaded is connected when there are a plurality of ULB-CCs to which the terminal apparatus is able to be connected, ULB base station apparatuses may receive an uplink signal (such as SRS: Sounding Reference Signal) of the LB-CC, and by measuring receive power, the LB base station apparatus may determine which ULB base station apparatus is closer. In this case, the LB base station apparatus decides the ULB-CC for offloading the terminal apparatus by acquiring information about a user, in which uplink has been detected, from a plurality of ULB base station apparatuses. As another example, the LB base station apparatus may decide to which ULB-CC the terminal apparatus is offloaded by obtaining position information about the terminal apparatus.

Communication between the LB base station apparatus and each of the ULB base station apparatuses may be performed by using an X2 interface or other means. The notification of the ULB-CC offload request includes information about a DL signal communication time period of a time period in which the ULB base station apparatus transmits data to be offloaded to the ULB-CC, and a synchronization signal and a data signal are transmitted between the ULB base station apparatuses within this time period.

While conventional timing when the downlink data signal is transmitted is at the same subframe with control information indicating data transmission of the downlink, as timing when the downlink data signal is transmitted in the ULB-CC according to the present embodiment, the downlink data signal may be transmitted within a plurality of subframes designated by the LB base station apparatus. For example, a time period of five subframes (5 msec), a time period of ten subframes (10 msec), a time period of twenty subframes (20 msec), or the like is designated. However, the time period is not limited to such an example and may be designated as a longer time period. Since the downlink data signal is not able to be transmitted when the ULB-CC is used by another system, by designating such a time period in which the data signal is transmitted in the ULB-CC, flexible transmission timing according to a usage state of the ULB-CC is able to be achieved. Since a time period in which the data signal is received in the ULB-CC is notified, the terminal apparatus is only required to detect the data signal only in the designated time period so that load of detection processing is reduced.

The notification of the ULB-CC offload request may include channel information about the ULB-CC, and when a plurality of channels exist as the ULB-CC, for example, the LB base station apparatus may designate a channel in which the synchronization signal and data are transmitted.

The LB base station apparatus transmits notification of the ULB-CC offload request to the terminal apparatus that offloads traffic to the ULB base station apparatus (S302). The notification of the ULB-CC offload request to the terminal apparatus may be performed by the PDCCH or the EPDCCH of the LB-CC or the notification may be performed by a control signal of a higher layer, for example, the RRC or the like. The notification of the ULB-CC offload request, which is received by the terminal apparatus, includes information about a DL signal communication time period of a time period in which the synchronization signal and the data signal are received from the ULB base station apparatus, and a cell ID of the ULB base station apparatus that transmits data. The notification of the ULB-CC offload request, which is received by the terminal apparatus, may include information about a channel in which the synchronization signal and the data signal are transmitted.

The ULB base station apparatus 1 performs carrier sense so as to avoid collision with another ULB base station apparatus or another system that uses the same channel at the time of transmission in the ULB-CC, and after determining that transmission is able to be performed in the ULB-CC, transmits the synchronization signal and the data (S303). In this case, the data signal also includes a DMRS as a reference signal for demodulation. As a method of transmitting the synchronization signal and the data signal, for example, the synchronization signal is transmitted in a manner of FIG. 5 and a signal in which the data and the DMRS are multiplexed is then transmitted instead of the reference signal RS. The terminal apparatus performs detection of the synchronization signal and the data signal in the DL signal communication time period. The terminal apparatus detects the synchronization signal by the synchronization signal detection unit 223 and detects the data signal by the received signal detection unit 227. The terminal apparatus inputs information, which indicates whether the data signal is detected correctly, to the UL control information generation unit 215, and transmits ACK/NACK as a result of data reception of the ULB-CC to the LB base station apparatus (S304). The LB base station apparatus notifies the ULB base station apparatus of the received ACK/NACK (S305). Here, the NACK is transmitted not only when error is detected by the CRC as a result of reception processing of the data signal, but also when the synchronization signal is not detected, when another system always performs occupation as a result of the carrier sense by the terminal apparatus in the DL signal communication time period, and when a radar signal is detected. Thus, the terminal apparatus may notify the LB base station apparatus of status information indicating a reason as described above together with the NACK.

Though the example in which neither transmission of downlink control information nor transmission of uplink control information is supported by the ULB-CC has been described in the example of the present embodiment, one of them may be supported by the ULB-CC. For example, when the transmission of the downlink control information is supported by the ULB-CC, a parameter (such as MCS, the number of streams, or channel information) related to data transmission of the downlink may be transmitted by the ULB-CC together with the synchronization signal and the data signal. When the transmission of the downlink control information is not supported by the ULB-CC, a parameter related to data transmission of the downlink is notified by the LB-CC together with notification of the ULB-CC offload request.

Though description has been given for the example in which the ULB base station apparatus performs the transmission after the carrier sense in the present embodiment, the ULB base station apparatus may transmit RTS (Request to Send) or CTS (Clear to Send)-to-self before data transmission of the downlink. In this case, NAV (Network Allocation Vector) may be configured to the RTS.

Note that, timing when the time period in which reception processing of the data signal is performed is applied after the terminal apparatus receives notification of the time period in which the data signal is received may be started from timing when control information is received or may be started from a predetermined time (for example, such as after 4 msec).

Though description has been given in the present embodiment for the example in which the terminal apparatus receives notification of the time period in which the data signal is received, cycles of the time period in which the data signal is received and a time period in which reception processing of the data signal is not performed may be notified, for example, during one frame (formed by ten subframes), four subframes are set as the time period in which the data signal is received and the others are set as the time period in which reception processing of the data signal is not performed. With such designation, the time period in which the data signal is received and the time period in which reception processing of the data signal is not performed are repeated periodically. The time period in which the data signal is received does not need to be continuous subframes, and discontinuous subframes may be designated. In this case, control information indicating, with bitmap, subframes in which reception processing of the data signal is performed among subframes in one frame is notified to the terminal apparatus.

As described above, in the present embodiment, when offloading traffic of the terminal apparatus to the ULB-CC, the LB base station apparatus notifies the terminal apparatus of the DL signal communication time period and notifies the ULB base station apparatus to transmit the synchronization signal and the data signal in the DL signal communication time period. When the ULB base station apparatus transmits the synchronization signal and the data signal in the DL signal communication time period, the terminal apparatus is able to efficiently receive data in the ULB-CC.

(Modified Example of Third Embodiment)

In the present embodiment, configuration examples of the LB base station apparatus, the ULB base station apparatus, and the terminal apparatus are similar to those of the first embodiment and are respectively illustrated in FIG. 6, FIG. 8, and FIG. 10. Configuration examples of the DL signal generation unit 101 of the LB base station apparatus and the DL signal generation unit 110 of the ULB base station apparatus are also similar to those of the first embodiment and are respectively illustrated in FIG. 7 and FIG. 9. Thus, in the present modified example, only different processing will be described and description for similar processing will be omitted.

FIG. 15 illustrates an example of a sequence chart according to the invention. FIG. 15 indicates an example in which the number of ULB base station apparatuses is one and indicates a case where the LB base station apparatus does not notify the terminal apparatus, which offloads traffic of the downlink to the ULB-CC, of a ULB-CC offload request, but notifies a ULB-CC offload request when offloading traffic of the uplink. First, the LB base station apparatus decides, by the connected terminal management unit 108, a terminal apparatus that offloads traffic to the ULB base station apparatus and notifies the ULB base station apparatus 1 of a ULB offload request (S301). In this case, it is assumed that the LB base station apparatus decides a terminal apparatus, which is to be offloaded to the ULB-CC, in accordance with a traffic quantity, channel quality of the LB-CC, or the like. For example, a user not requiring low delay and associated with high traffic or a user providing low channel quality in the LB-CC is connected to the ULB-CC. As an example of deciding to which ULB-CC the terminal apparatus that is offloaded is connected when there are a plurality of ULB-CCs to which the terminal apparatus is able to be connected, ULB base station apparatuses may receive an uplink signal (such as SRS) of the LB-CC, and by measuring receive power, the LB base station apparatus may determine which ULB base station apparatus is closer. In this case, the LB base station apparatus decides the ULB-CC for offloading the terminal apparatus by acquiring information about a user, in which uplink has been detected, from a plurality of ULB base station apparatuses. As another example, the LB base station apparatus may decide to which ULB-CC the terminal apparatus is offloaded by obtaining position information about the terminal apparatus. As still another example, the LB base station apparatus may make a transmission request of the SRS in the ULB-CC to the terminal apparatus in advance, and the terminal apparatus may transmit the SRS in a fixed cycle in the designated ULB-CC or transmit the SRS upon reception of trigger so that the ULB-CC for offloading is decided.

Communication between the LB base station apparatus and each of the ULB base station apparatuses may be performed by using an X2 interface or other means. The notification of the ULB-CC offload request includes information about a UL signal communication time period of a time period in which data to be offloaded to the ULB-CC is transmitted, and the terminal apparatus transmits a preamble and a data signal to the ULB base station apparatus within this time period.

While conventional timing when the uplink data signal is transmitted is at the subframe after 4 msec from control information indicating data transmission of the uplink, as timing when the uplink data signal is transmitted in the ULB-CC according to the present embodiment, the uplink data signal may be transmitted within a plurality of subframes designated by the LB base station apparatus. For example, a time period of five subframes (5 msec), a time period of ten subframes (10 msec), a time period of twenty subframes (20 msec), or the like is designated. However, the time period is not limited to such an example and may be designated as a longer time period. Since the uplink data signal is not able to be transmitted when the ULB-CC is used by another system, by designating such a time period in which the data signal is transmitted in the ULB-CC, flexible transmission timing according to a usage state of the ULB-CC is able to be achieved. Since a time period in which the data signal is received in the ULB-CC is notified, the ULB base station apparatus is only required to detect the data signal only in the designated time period so that load of detection processing is reduced.

The notification of the ULB-CC offload request may include channel information about the ULB-CC, and when a plurality of channels exist as the ULB-CC, for example, the LB base station apparatus may designate a channel in which the preamble and the data signal are transmitted.

The LB base station apparatus transmits notification of the ULB-CC offload request to the terminal apparatus that offloads traffic to the ULB base station apparatus (S302). The notification of the ULB-CC offload request to the terminal apparatus may be performed by the PDCCH or the EPDCCH of the LB-CC or the notification may be performed by a control signal of a higher layer, for example, the RRC or the like. The notification of the ULB-CC offload request, which is received by the terminal apparatus, includes information about a UL signal communication time period of the time period in which the preamble and the data signal are transmitted to the ULB base station apparatus, and information (such as a cell ID) of the ULB-CC that transmits data. The notification of the ULB-CC offload request, which is received by the terminal apparatus, may include information about a channel used for transmission of the preamble and the data signal.

The terminal apparatus performs carrier sense so as to avoid collision with another ULB base station apparatus or another system that uses the same channel at the time of transmission in the ULB-CC, and after determining that transmission is able to be performed in the ULB-CC, transmits the preamble and the data (S403). In this case, the data signal also includes a DMRS as a reference signal for demodulation, and a cell ID notified from the LB base station apparatus may be used for a sequence of the DMRS. As a method of transmitting the preamble and the data signal, for example, the preamble is transmitted in a manner of FIG. 5 and a signal in which the data and the DMRS are multiplexed is then transmitted instead of the reference signal RS. The ULB base station apparatus 1 detects the preamble and the data signal in the UL signal communication time period. The ULB base station apparatus 1 detects the preamble and detects the data signal by the UL signal demodulation unit 106. The ULB base station apparatus 1 transmits ACK/NACK, which is information indicating whether the data signal is detected correctly, to the terminal apparatus (S404). Though the example in which transmission of the downlink control information is supported by the ULB-CC has been described in the example of the present embodiment, the transmission may not be supported by the ULB-CC. For example, when the transmission of the downlink control information is not supported by the ULB-CC, the ULB base station apparatus may notify the LB base station apparatus of the information about the ACK/NACK and the LB base station apparatus may perform the notification to the terminal apparatus. Moreover, a parameter (such as MCS, the number of streams, channel information, or information about the reference signal) related to data transmission of the uplink may be notified from the LB base station apparatus to the terminal apparatus together with the notification of the ULB-CC offload request or may be notified from the ULB base station apparatus.

Though description has been given for the example in which the terminal apparatus starts the transmission after the carrier sense in the present embodiment, the terminal apparatus may transmit RTS (Request to Send) or CTS (Clear to Send)-to-self before data transmission of the uplink. In this case, NAV (Network Allocation Vector) may be configured to the RTS.

Note that, timing when the time period in which reception processing of the data signal is performed is applied after the terminal apparatus receives notification of the time period in which the data signal is transmitted may be started from timing when control information is received or may be started from a predetermined time (for example, such as after 4 msec).

Though description has been given in the present embodiment for the example in which the terminal apparatus receives notification of the time period in which the data signal is transmitted, cycles of the time period in which the data signal is able to be transmitted and a time period in which the data signal is not able to be transmitted may be notified, for example, during one frame (formed by ten subframes), four subframes are set as the time period in which the data signal is able to be transmitted and the others are set as the time period in which the data signal is not able to be transmitted. With such designation, the time period in which the data signal is able to be transmitted and the time period in which the data signal is not able to be transmitted are repeated periodically. The time period in which the data signal is able to be transmitted does not need to be continuous subframes, and discontinuous subframes may be designated. In this case, control information indicating, with bitmap, subframes in which the data signal is able to be transmitted among subframes in one frame is notified to the terminal apparatus.

As described above, in the present embodiment, when offloading traffic of the terminal apparatus to the ULB-CC, the LB base station apparatus notifies the terminal apparatus of the UL signal communication time period and notifies the ULB base station apparatus to receive the preamble and the data signal in the UL signal communication time period. When the ULB base station apparatus receives the preamble and the data signal in the UL signal communication time period, the terminal apparatus is able to efficiently transmit data in the ULB-CC.

A program which runs in the base station apparatus and the terminal apparatus concerning the invention is a program that controls a CPU and the like (program that causes a computer to function) such that the functions in the aforementioned embodiments concerning the invention are realized. The pieces of information handled by the apparatuses are temporarily accumulated in a RAM during the processing thereof, and then stored in various ROMs and HDDs, and read, corrected, and written by the CPU as necessary. A recording medium that stores the program therein may be any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), and the like. Moreover, there is also a case where, by executing the loaded program, not only the functions of the aforementioned embodiments are realized, but also by performing processing in cooperation with an operating system, other application programs, or the like on the basis of an instruction of the program, the functions of the invention are realized.

When being distributed in the market, the program is able to be stored in a portable recording medium and distributed or be transferred to a server computer connected through a network such as the Internet. In this case, a storage apparatus of the server computer is also included in the invention. A part or all of the base station apparatus and the terminal apparatus in the aforementioned embodiments may be realized as an LSI which is a typical integrated circuit. Each functional block of the base station apparatus and the terminal apparatus may be individually formed into a chip, or a part or all thereof may be integrated and formed into a chip. Further, a method for making into an integrated circuit is not limited to the LSI and a dedicated circuit or a versatile processor may be used for realization. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Moreover, the invention of the present application is not limited to the aforementioned embodiments. The terminal apparatus of the present application is not limited to be applied to a mobile station apparatus, but, needless to say, is applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included. The invention can be modified in various manners within the scope defined by the Claims, and embodiments obtained by appropriately combining technical means disclosed in different embodiments are also encompassed by the technical scope of the invention. A configuration in which elements described in each of the aforementioned embodiments and achieving similar effects are replaced with each other is also encompassed.

Note that, the present international application claims priority from Japanese Patent Application No. 2014-185780 filed on Sep. 12, 2014, and the entire contents of Japanese Patent Application No. 2014-185780 are hereby incorporated herein by reference.

REFERENCE SIGNS LIST 10 macro base station apparatus
11, 12 ULB base station apparatus
21, 22, 23 terminal apparatus
101 DL signal generation unit
102-1 to 102-2 radio transmission unit
103-1 to 103-2 transmit antenna
104 receive antenna
105 radio reception unit
106 UL signal demodulation unit
108 connected terminal management unit
1011 S/P unit
1012-1 to 1012-2 data signal generation unit
1013-1 to 1013-2 synchronization signal multiplexing unit
1014-1 to 1014-2 control signal multiplexing unit
1015-1 to 1015-2 reference signal multiplexing unit
1016 synchronization signal generation unit
1017 control signal generation unit
1018 reference signal generation unit
1019-1 to 1019-2 IFFT unit
109 connected terminal management unit
110 DL signal generation unit
1106 synchronization signal generation unit
1107 control signal generation unit
1108 reference signal generation unit
201 receive antenna
202 radio reception unit
204 FFT unit
205 control signal separation unit
206 reference signal separation unit
207 received signal detection unit
208 channel estimation unit
209 control signal detection unit
211 UL signal generation unit
212 UL control information multiplexing unit
213 radio transmission unit
214 transmit antenna
215 UL control information generation unit
221 receive antenna
222 radio reception unit
223 synchronization signal detection unit
224 FFT unit
225 control signal separation unit 226 reference signal separation unit
227 received signal detection unit
228 channel estimation unit
229 control signal detection unit

The invention claimed is:

1. A base station apparatus that communicates with a terminal apparatus, the base station apparatus comprising:
a transmission circuitry configured to transmit a data signal and information about measurement of receive power in a component carrier of an unlicensed band to the terminal apparatus, and
a reception circuitry configured to receive a measurement result of the receive power from the terminal apparatus, wherein
the information about the measurement of the receive power is transmitted by using RRC,
the information about the measurement of the receive power includes a time period for measuring the receive power,
the transmission circuitry transmits the data signal with a component carrier of a licensed band in a first frame format, and transmits the data signal with the component carrier of the unlicensed band in a second frame format,
a radio frame in the first frame format and the second frame format is constituted by ten subframes,
the first frame format is Time Division Duplex (TDD) constituted by an uplink and a downlink,
the second frame format is a format constituted only by a subframe of the downlink,
the data signal is transmitted by Carrier Aggregation in which one primary cell and one or more secondary cells are used,
the primary cell is a component carrier of a licensed band,
at least one of the secondary cells is a component carrier of an unlicensed band, and the rest of the secondary cells are a component carrier of a licensed band,
on the component carrier of the unlicensed band, Listen Before Talk is performed before transmitting the data signal,
the subframe includes fourteen OFDM symbols, and
the transmission circuity transmits a synchronization signal with the fourteenth OFDM symbol in subframes #1 and #6 in the radio frame with the component carrier of the licensed band, and transmits no synchronization signal with the fourteenth OFDM symbol in the subframes #1 and #6 in the radio frame with the component carrier of the unlicensed band.

2. The base station apparatus according to claim 1, wherein the information about the measurement of the receive power includes a cycle for measuring the receive power.

3. The base station apparatus according to claim 1, wherein the information about the measurement of the receive power is information about measurement of RSSI.

4. The base station apparatus according to claim 1, wherein the measurement result of the receive power includes a measurement result of receive power of the OFDM symbol in a time period for the measurement.

5. The base station apparatus according to claim 1, wherein the measurement result of the receive power includes a report about a channel in which the receive power exceeds a threshold that is set by the base station apparatus.

6. The base station apparatus according to claim 1, wherein the reception circuitry receives the measurement result of the receive power with the component carrier of the licensed band.

7. The base station apparatus according to claim 1, wherein the transmission circuitry transmits the information about the measurement of the receive power by using the component carrier of the licensed band.

8. A communication method for a base station apparatus that communicates with a terminal apparatus, the method comprising:
a first step of transmitting a data signal and information about measurement of receive power in a component carrier of an unlicensed band to the terminal apparatus, and
a second step of receiving a measurement result of the receive power from the terminal apparatus, wherein
the information about the measurement of the receive power is transmitted by using RRC,
the information about the measurement of the receive power includes a time period for measuring the receive power,
the first step transmits the data signal with a component carrier of a licensed band in a first frame format, and transmits the data signal with the component carrier of the unlicensed band in a second frame format,
a radio frame in the first frame format and the second frame format is constituted by ten subframes,
the first frame format is Time Division Duplex (TDD),
the second frame format is a format constituted by a subframe of the downlink,
the data signal is transmitted by Carrier Aggregation in which one primary cell and one or more secondary cells are used,
the primary cell is a component carrier of a licensed band,
at least one of the secondary cells is a component carrier of an unlicensed band, and the rest of the secondary cells are a component carrier of a licensed band,
on the component carrier of the unlicensed band, Listen Before Talk is performed before transmitting the data signal,
the subframe includes fourteen OFDM symbols, and
the first step transmits a synchronization signal with the fourteenth OFDM symbol in subframes #1 and #6 in the radio frame with the component carrier of the licensed band, and transmits no synchronization signal with the fourteenth OFDM symbol in the subframes #1 and #6 in the radio frame with the component carrier of the unlicensed band.

9. A terminal apparatus that communicates with a base station apparatus, the terminal apparatus comprising:
a reception circuitry configured to receive a data signal and information about measurement of receive power in a component carrier of an unlicensed band from the base station apparatus, and
a transmission circuitry configured to transmit a measurement result of the receive power to the base station apparatus, wherein
the information about the measurement of the receive power is transmitted by using RRC,
the information about the measurement of the receive power includes a time period for measuring the receive power,
the reception circuitry receives the data signal with a component carrier of a licensed band in a first frame format, and receives the data signal with the component carrier of the unlicensed band in a second frame format,
a radio frame in the first frame format and the second frame format is constituted by ten subframes,
the first frame format is Time Division Duplex (TDD), the second frame format includes a format in which a part of the radio frame is constituted by a subframe of a downlink and a format in which all of the radio frame is constituted by the subframe of the downlink, the data signal is received by Carrier Aggregation in which one primary cell and one or more secondary cells are used, the primary cell is a component carrier of a licensed band, at least one of the secondary cells is a component carrier of an unlicensed band, and the rest of the secondary cells are a component carrier of a licensed band, on the component carrier of the unlicensed band, Listen Before Talk is performed before transmitting the data signal, the subframe includes fourteen OFDM symbols, and the reception circuitry receives a synchronization signal from the fourteenth OFDM symbol in subframes #1 and #6 in the radio frame with the component carrier of the licensed band, and receives no synchronization signal with the fourteenth OFDM symbol in the subframes #1 and #6 in the radio frame with the component carrier of the unlicensed band.

10. A communication method for a terminal apparatus that communicates with a base station apparatus, the method comprising:

a first step of receiving a data signal and information about measurement of receive power in a component carrier of an unlicensed band from the base station apparatus, and a second step of transmitting a measurement result of the receive power to the base station apparatus, wherein the information about the measurement of the receive power is transmitted by using RRC, the information about the measurement of the receive power includes a time period for measuring the receive power, the first step receives the data signal with a component carrier of a licensed band in a first frame format, and receives the data signal with the component carrier of the unlicensed band in a second frame format, a radio frame in the first frame format and the second frame format is constituted by ten subframes, the first frame format is Time Division Duplex (TDD), the second frame format includes a format in which a part of the radio frame is constituted by a subframe of a downlink and a format in which all of the radio frame is constituted by the subframe of the downlink, the data signal is received by Carrier Aggregation in which one primary cell and one or more secondary cells are used, the primary cell is a component carrier of a licensed band, at least one of the secondary cells is a component carrier of an unlicensed band, and the rest of the secondary cells are a component carrier of a licensed band, on the component carrier of the unlicensed band, Listen Before Talk is performed before transmitting the data signal, the subframe includes fourteen OFDM symbols, and the first step receives a synchronization signal with the fourteenth OFDM symbol in subframes #1 and #6 in the radio frame with the component carrier of the licensed band, and receives no synchronization signal with the fourteenth OFDM symbol in the subframes #1 and #6 in the radio frame with the component carrier of the unlicensed band.

* * * * *